(12) United States Patent  
Takahashi et al.

(10) Patent No.: US 12,134,714 B2  
(45) Date of Patent: Nov. 5, 2024

(54) THERMOSETTING ADHESIVE AND ADHESIVE SHEET

(71) Applicant: Nitto Shinko Corporation, Sakai (JP)

(72) Inventors: Yoshiki Takahashi, Sakai (JP); Risako Tokunaga, Sakai (JP)

(73) Assignee: NITTO SHINKO CORPORATION, Sakai (JP)

( * ) Notice: Subject to any disclaimer, the term of this patent is extended or adjusted under 35 U.S.C. 154(b) by 553 days.

(21) Appl. No.: 17/426,072

(22) PCT Filed: Feb. 4, 2020

(86) PCT No.: PCT/JP2020/004058  
§ 371 (c)(1),  
(2) Date: Jul. 27, 2021

(87) PCT Pub. No.: WO2020/162434  
PCT Pub. Date: Aug. 13, 2020

(65) Prior Publication Data  
US 2022/0098458 A1   Mar. 31, 2022

(30) Foreign Application Priority Data

Feb. 5, 2019   (JP) ................................ 2019-018648

(51) Int. Cl.  
*C09J 7/35* (2018.01)  
*C09J 5/08* (2006.01)  
(Continued)

(52) U.S. Cl.  
CPC ............... *C09J 175/04* (2013.01); *C09J 5/08* (2013.01); *C09J 7/35* (2018.01); *C09J 11/04* (2013.01);  
(Continued)

(58) Field of Classification Search  
None  
See application file for complete search history.

(56) References Cited

U.S. PATENT DOCUMENTS 7,125,461 B2 * 10/2006 Czaplicki ............. C09D 163/00  
156/289  
2003/0186049 A1 * 10/2003 Czaplicki ........... C08G 59/4021  
428/343  
(Continued)

FOREIGN PATENT DOCUMENTS

EP      3 284 793 A1    2/2018  
JP      2008-248240 A   10/2008  
(Continued)

OTHER PUBLICATIONS

Extended (Supplementary) European Search Report dated Aug. 31, 2022, issued in counterpart EP application No. 20752910.8. (8 pages).

(Continued)

*Primary Examiner* — Anish P Desai  
(74) *Attorney, Agent, or Firm* — WHDA, LLP

(57) ABSTRACT

Provided is a thermosetting adhesive including: a polyurethane; an isocyanate; an epoxy; and a phenoxy resin, in which dynamic viscoelasticity spectrum of a cured product has a peak indicating a softening temperature in an area of 200° C. or higher and has no peak in an area of 160° C. or lower.

8 Claims, 9 Drawing Sheets

(51) Int. Cl.
*C09J 11/04* (2006.01)
*C09J 11/06* (2006.01)
*C09J 151/08* (2006.01)
*C09J 171/10* (2006.01)
*C09J 175/04* (2006.01)

(52) U.S. Cl.
CPC ............ *C09J 11/06* (2013.01); *C09J 151/08* (2013.01); *C09J 171/10* (2013.01); *C09J 2301/124* (2020.08); *C09J 2451/00* (2013.01); *C09J 2475/00* (2013.01); *Y10T 428/249984* (2015.04); *Y10T 428/287* (2015.01); *Y10T 428/2896* (2015.01)

(56) References Cited

U.S. PATENT DOCUMENTS

| | | | | |
|---|---|---|---|---|
| 2008/0113184 | A1* | 5/2008 | Yoshida | C09J 163/00 428/332 |
| 2008/0308212 | A1 | 12/2008 | Sheasley et al. | |
| 2010/0096175 | A1* | 4/2010 | Ishimatsu | H01L 24/83 428/343 |
| 2012/0135196 | A1* | 5/2012 | Sugasaki | B41C 1/05 264/494 |
| 2014/0113983 | A1* | 4/2014 | Czaplicki | C09J 181/04 521/95 |
| 2014/0147776 | A1 | 5/2014 | Ito et al. | |
| 2018/0134926 | A1 | 5/2018 | Lei et al. | |
| 2019/0106607 | A1 | 4/2019 | Yamamoto et al. | |

FOREIGN PATENT DOCUMENTS

| | | | |
|---|---|---|---|
| JP | 2010-529285 | A | 8/2010 |
| JP | 2013-76031 | A | 4/2013 |
| JP | 2013-229277 | A | 11/2013 |
| JP | 2015-81329 | A | 4/2015 |
| JP | 2016-121289 | A | 7/2016 |
| JP | 2016-195090 | A | 11/2016 |
| WO | 2012/173242 | A1 | 12/2012 |
| WO | 2016/163514 | A1 | 10/2016 |
| WO | 2017/204218 | A1 | 11/2017 |

OTHER PUBLICATIONS

Office Action dated Dec. 9, 2022, issued in counterpart JP application No. 2019-018648, with English translation. (8 pages).

Notification of Transmittal of Translation of the International Preliminary Report on Patentability (Form PCT/IB/338) issued in counterpart International Application No. PCT/JP2020/004058 mailed Aug. 19, 2021 with Forms PCT/IB/373, PCT/ISA/237 and PCT/IB/326, with English translation. (15 pages).

International Search Report dated Mar. 10, 2020, issued in counterpart International Application No. PCT/JP2020/004058 (2 pages).

* cited by examiner

Standard formulation

Variable formulation 0.9 times

THERMOSETTING ADHESIVE AND ADHESIVE SHEET

CROSS-REFERENCE TO RELATED APPLICATION

This application claims priority to Japanese Patent Application No. 2019-018648, the disclosure of which is incorporated herein by reference in its entirety.

FIELD

The present invention relates to a thermosetting adhesive, and an adhesive sheet provided with an adhesive layer including the thermosetting adhesive.

BACKGROUND

Conventionally, a thermosetting adhesive including, as an adhesive component, a thermosetting resin such as an epoxy resin or an unsaturated polyester resin has been widely used. An adhesive sheet in which an adhesive layer including the thermosetting adhesive is laminated on a base sheet has a wide range of applications and has been used in various applications since it can be inserted into a small, narrow portion or can be folded for use. The thermosetting adhesive of this type generally exhibits high adhesive force even at high temperatures while a pressure-sensitive adhesive, for example, decreases its adhesive force at high temperatures, and is thus widely used for causing parts to adhere to each other in electric apparatuses, power machines, or the like that generate heat while being driven.

In recent years, as shown in Patent Literature 1, an adhesive sheet in which an adhesive that includes microcapsule-type expansion agent is used for forming the adhesive layer has been considered for use. The adhesive sheet is excellent in convenience because, by simply interposing the adhesive sheet between parts and heating the same, the adhesive layer causes volume expansion to enable the parts to adhere to each other.

CITATION LIST

Patent Literature

Patent Literature 1: JP 2013-076031 A

SUMMARY

Technical Problem

If a thermosetting adhesive composed only of an adhesive component or a thermosetting adhesive including an adhesive component and a foaming agent component, which is more excellent in heat resistance than conventional adhesives, is obtained, the thermosetting adhesive and the adhesive sheet can extend its range of applications. An epoxy-modified polyurethane resin in which an epoxy is bonded to a polyurethane resin is excellent in heat resistance, and is therefore suitable as a constituent material of the adhesive component of the thermosetting adhesive as described above. However, it is difficult to say that the epoxy-modified polyurethane resin is excellent in toughness, and for example, the epoxy-modified polyurethane resin, if included in an adhesive layer of an adhesive sheet, may cause cracks in the adhesive layer when the adhesive sheet is, for example, bent. The problem that cracks or the like are generated due to insufficient toughness may occur regardless of whether or not the thermosetting adhesive is foamed.

A possible method of increasing the toughness of the epoxy-modified polyurethane resin may be to include, for example, a soft phenoxy resin in the adhesive component. However, merely including the phenoxy resin may cause the heat resistance of a cured product obtained by curing the thermosetting adhesive to be affected by the phenoxy resin having lower heat resistance than the epoxy-modified polyurethane resin, and may thus cause the cured product to have insufficient heat resistance. The present invention has been conceived focusing on such a matter, and it is an object of the present invention to provide a thermosetting adhesive having features of both the heat resistance of an epoxy-modified polyurethane resin and the toughness of a phenoxy resin, and further provide an adhesive sheet hardly causing cracks or the like in an adhesive layer.

Solution to Problem

In order to solve the above problem, the present invention provides a thermosetting adhesive including an adhesive component, in which dynamic viscoelasticity spectrum of a cured product obtained by curing the thermosetting adhesive has a peak indicating a softening temperature in an area of 200° C. or higher and has no peak in an area of 160° C. or lower, the adhesive component includes a polyurethane, an isocyanate, and an epoxy to form an epoxy-modified polyurethane, and the adhesive component further includes a phenoxy resin.

In order to solve the above problem, the present invention provides an adhesive sheet including: a base layer composed of a sheet-shaped base material; and an adhesive layer composed of the thermosetting adhesive, in which the adhesive layer is laminated on one side, or each of both sides, of the base layer.

DESCRIPTION OF EMBODIMENTS

An embodiment of the present invention will be described by way of specific examples. The embodiment of the present invention will be hereinafter described by taking, for example, the case where an adhesive sheet is used in semiconductor apparatuses such as an inverter or a converter. More specifically, a description will be given on an embodiment of an adhesive sheet by taking, for example, the case where the adhesive sheet is used in substitution for an insulating paper used for insulation between terminals.

Figure 1:
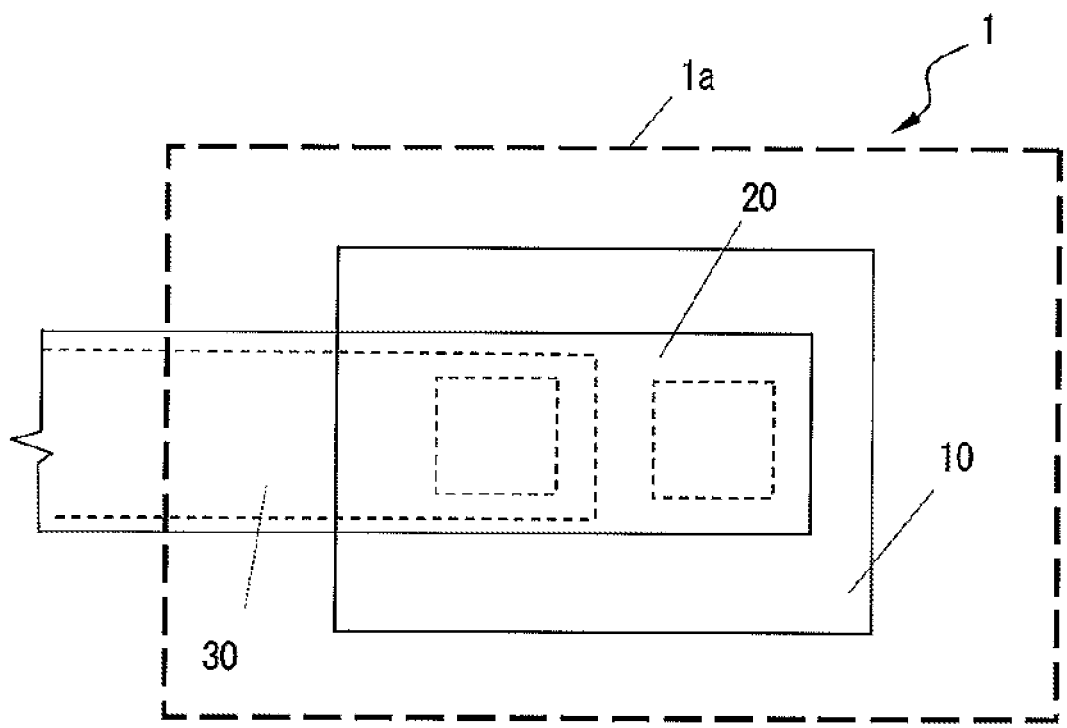
FIG. 1 is a schematic plan view of a semiconductor apparatus.
Figure 2:
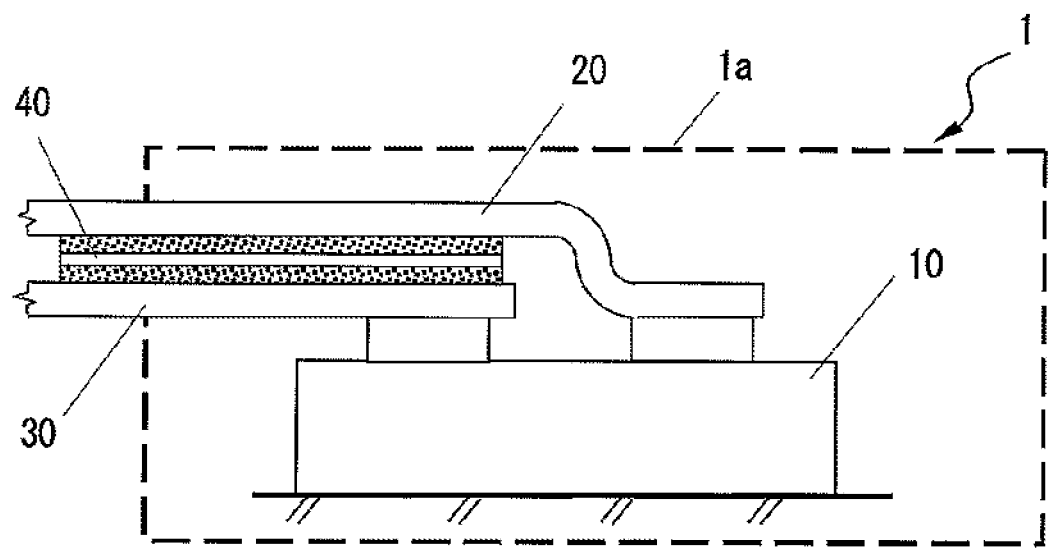
FIG. 2 is a schematic side view of a semiconductor apparatus.

FIG. 1 is a plan view of a semiconductor apparatus 1 according to this embodiment, and FIG. 2 is a side view of the same. The semiconductor apparatus 1 according to this embodiment includes a semiconductor device 10 and a housing 1a accommodating the semiconductor device 10. The semiconductor apparatus 1 further includes a positive electrode terminal 20 made of a metal plate electrically connected to a positive electrode of the semiconductor device 10 and a negative electrode terminal 30 made of a metal plate electrically connected to a negative electrode of the semiconductor device 10. The positive electrode terminal 20 and the negative electrode terminal 30 are arranged to have their surfaces opposed to each other, and are caused to adhere to each other with an adhesive sheet 40 in this embodiment, and are electrically insulated by the adhesive sheet 40. That is, the adhesive sheet in this embodiment is used to be interposed between two members (i.e., the positive electrode terminal 20 and the negative electrode terminal 30) to cause these members to adhere to each other.

The adhesive sheet 40 in this embodiment has two adhesive surfaces, namely: a first adhesive surface 40a adhering to a surface of one of the two terminals 20 and 30 (i.e., positive electrode terminal 20); and a second adhesive surface 40b opposite to the first adhesive surface 40a and adhering to a surface of the other of the two terminals 20 and 30 (i.e., negative electrode terminal 30).

Figure 3A:
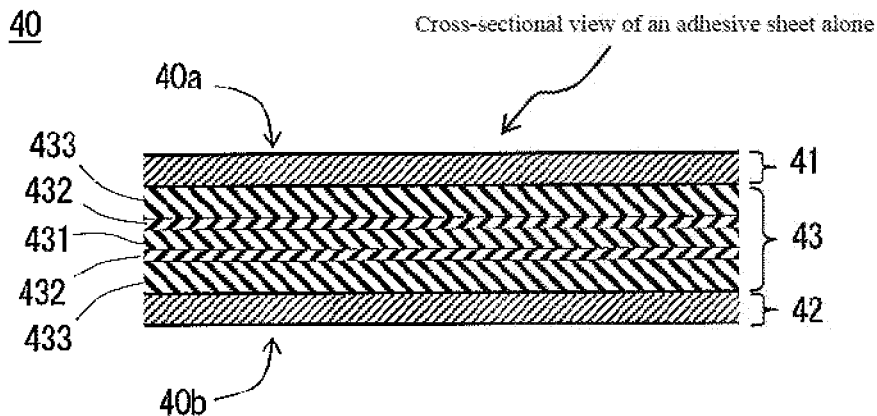
FIGS. 3A and 3B are schematic cross-sectional views each of an adhesive sheet according to one embodiment.
Figure 3B:
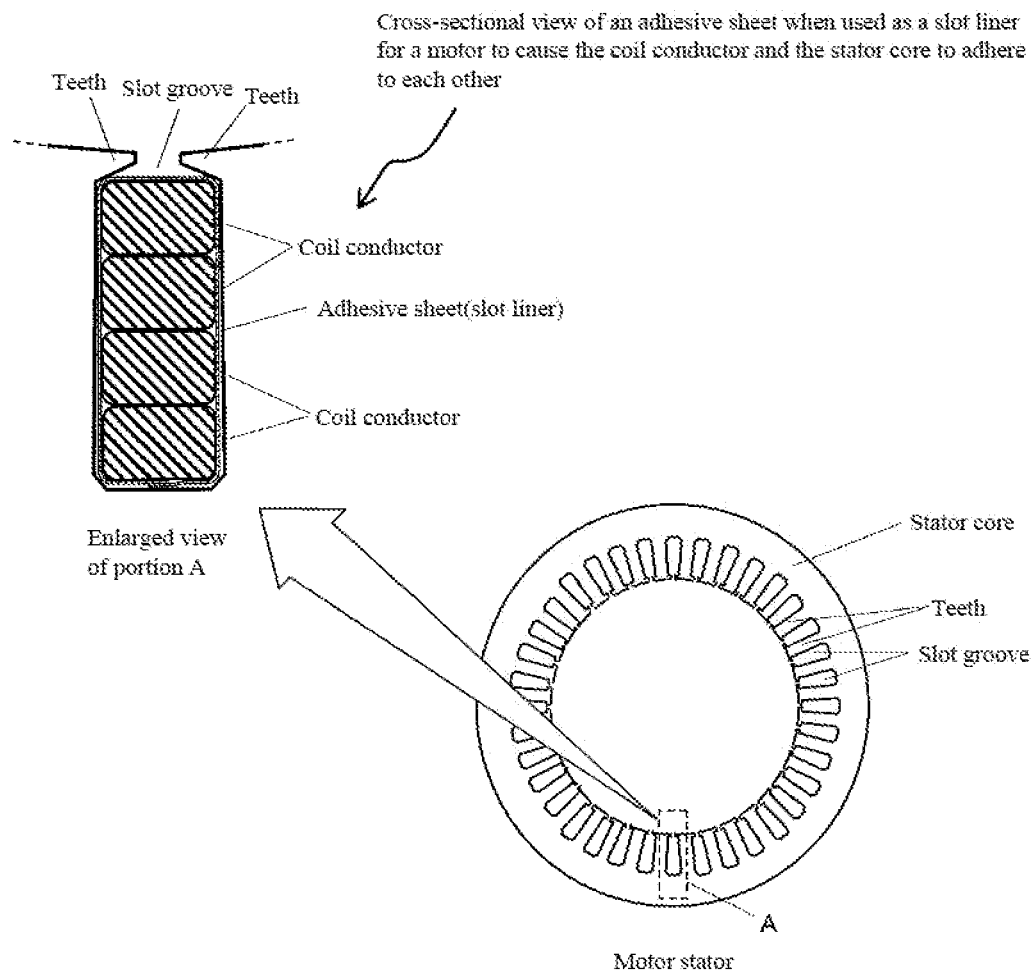

The adhesive sheet 40 in this embodiment has one surface or both surfaces serving as the adhesive surface(s). The adhesive sheet 40 of this embodiment includes two adhesive layers each having one surface serving as an adhesive surface. As shown in FIGS. 3A and 3B, the adhesive sheet 40 in this embodiment includes a base layer 43 composed of a sheet-shaped base material in a center portion in a thickness direction, and has two adhesive layers, namely: a first adhesive layer 41 laminated on one side of the base layer 43 and a second adhesive layer 42 laminated on the other side of the base layer 43. The first adhesive layer 41 constitutes the first adhesive surface 40a, and the opposite surface to the surface of the first adhesive layer 41 that contacts the base layer 43 serves as the first adhesive surface 40a. The first adhesive layer 42 constitutes the second adhesive surface 40b, and the opposite surface to the surface of the second adhesive layer 42 that contacts the base layer 43 serves as the second adhesive surface 40b.

At least one of the first adhesive layer 41 and the second adhesive layer 42 is formed of a thermosetting adhesive that includes: an adhesive component having thermosetting properties so as to be a heat-cured foam by being heated; and a foaming agent component. In this embodiment, both the first adhesive layer 41 and the second adhesive layer 42 are formed of the thermosetting adhesive including the foaming agent component.

In the thermosetting adhesive of this embodiment, a peak indicating the softening temperature develops in an area of 200° C. or higher when dynamic viscoelasticity spectrum of the cured product obtained by curing the thermosetting adhesive is measured. The peak can be confirmed with the measured curve of the loss tangent (tan δ: E"/E') that represents the ratio of the loss modulus (E") to the storage modulus (E'), and can be confirmed as the peak of the measured curve that projects upward with a horizontal axis as the measurement temperature and a vertical axis as the loss tangent (tan δ). The softening temperature of the cured product obtained by curing the thermosetting adhesive means the temperature at the intersection of a tangent at a first point located on a side 10 to 30° C. lower than the peak top of the measured curve, and a tangent at a second point located on a side 10 to 30° C. higher than the peak top of the measured curve. The thermosetting adhesive does not show any peak in an area of 160° C. or less when the dynamic viscoelasticity spectrum of the cured product obtained by curing the thermosetting adhesive is measured. The thermosetting adhesive of this embodiment has no peak in a range of above 160° C. to below the softening temperature. That is, the thermosetting adhesive of this embodiment has no peak appearing at least between ambient temperature (30°

C.) and 200° C. when the dynamic viscoelasticity spectrum is measured for the cured product obtained by curing the thermosetting adhesive.

The dynamic viscoelasticity spectrum can be obtained under the conditions below using a test piece made of the cured product of the thermosetting adhesive. The dynamic viscoelasticity spectrum measurement uses a strip-shaped test piece cut out of a test sheet composed of a glass cloth having warps and wefts and having a thickness of 100 μm, and being immersed with the thermosetting adhesive and then cured. As the strip-shaped test piece, a strip-shaped test piece having a width of about 3 mm that has been cut out of the test sheet so that the warps and the wefts each make an angle of 45 degrees relative to the longitudinal direction is employed.

<Measurement Conditions>
Measurement mode: Tensile
Measurement frequency: 1 Hz
Strain: 0.1%
Distance between supporting points: 20 mm
Heating rate: 5/min (30° C. to 260° C.)

The adhesive component in the thermosetting adhesive includes a polyurethane, an isocyanate, and an epoxy to form an epoxy-modified polyurethane resin. The adhesive component further includes a phenoxy resin. It is preferable that the isocyanate be partially or entirely a blocked isocyanate in which their isocyanate groups are blocked by a blocking agent, in terms of being capable of prolonging the pot life of the thermosetting adhesive. The blocked isocyanate can be preferable also in that the blocking agent sometimes produces an advantageous effect for the thermosetting adhesive, as will be described later. In this embodiment, the isocyanate is entirely the blocked isocyanate. The blocked isocyanate has a plurality of blocked isocyanate groups from which the blocking agent is removed by being heated to become isocyanate groups. The polyurethane has a plurality of active hydrogen atoms so as to be capable of connection via the blocked isocyanate. Specifically, the polyurethane has a plurality of hydroxy groups in the molecule. The polyurethane has a functional group for being chemically bonded to the epoxy, and has a carboxyl group in this embodiment. The polyurethane has a chain-like molecular structure, has the hydroxy groups at both terminals of the molecule, and has the carboxyl group at one or more locations between the hydroxy groups. The epoxy has a plurality of epoxy groups in a single molecule. That is, in the thermosetting adhesive, the polyurethane, the blocked isocyanate, and the epoxy are chemically bonded to each other by being heated to form the epoxy-modified polyurethane resin. More specifically, in the thermosetting adhesive, the blocked isocyanate having been heated becomes a polyisocyanate that bonds the polyurethane molecules to each other to form the main chain of the epoxy-modified polyurethane resin, and the epoxy is grafted by reacting with the carboxyl group provided in the main chain to form the epoxy-modified polyurethane resin.

In the case where a polyol and a polyisocyanate are caused to react with each other to form a polyurethane resin, these are generally mixed so that the active hydrogen of the polyol and the isocyanate group of the polyisocyanate are equal to each other in their numbers of moles. In the thermosetting adhesive of this embodiment, on the other hand, the blocked isocyanate group of the blocked isocyanate is set to be insufficient relative to the active hydrogen, and where the number of moles of the active hydrogen included per unit mass is "$M_{AH}$ (mol/g)", the number of blocked isocyanate groups included per unit mass "$M_{CN}$ (mol/g)" is 0.85 $M_{AH}$ or less. The number of isocyanate groups at the time of reaction is set to be insufficient relative to the active hydrogen so that the phenoxy resin is easily involved in the reaction. If the sufficient isocyanate groups are present at the time of the reaction to cause the phenoxy resin to be hardly involved in the reaction, the heat resistance of the cured product after being cured is easily affected by the phenoxy resin. The phenoxy resin is excellent in toughness but has a softening temperature of only about 100° C., and has less sufficient heat resistance than that of the epoxy-modified polyurethane resin having a softening temperature of as high as or higher than 200° C. If heat of a temperature higher than the softening temperature of the phenoxy resin is applied between the positive electrode terminal 20 and the negative electrode terminal 30 that are caused to adhere to each other in the state where the cured product is easily affected by the phenoxy resin, decrease in adhesion easily occurs and the adhesive sheet may be separated from any of the terminals when a force is applied between the positive electrode terminal 20 and the negative electrode terminal 30 in the heated state. In the thermosetting adhesive of this embodiment, in contrast, the phenoxy resin becomes easily involved in the reaction to be firmly bound in the cured product at the time of the curing reaction of the epoxy-modified polyurethane resin. Thus, in this embodiment, the decrease in adhesion due to the heating as described above hardly occurs.

In order to more reliably exert the aforementioned effect, the number of blocked isocyanate groups per unit mass "$M_{CN}$ (mol/g)" in the thermosetting adhesive is more preferably 0.80 $M_{AH}$ or less, further preferably 0.77 $M_{AH}$ or less. However, when the isocyanate groups are excessively insufficient, the curing reaction of the thermosetting adhesive may consume time, or the cured product may fail to exert sufficient strength. From such a point of view, the number of blocked isocyanate groups "$M_{CN}$ (mol/g)" is preferably 0.6 $M_{AH}$ or more, more preferably 0.65 $M_{AH}$ or more.

The suitable mixing amount of the blocked isocyanate, if necessary, can be precisely obtained by measuring dynamic viscoelasticity spectrum. For example, when the blocked isocyanate has a general mixing amount (for example, 0.9 $M_{AH}$ to 1.1 $M_{AH}$), a peak is observed at the softening temperature of the phenoxy resin by measuring dynamic viscoelasticity spectrum for the cured product obtained by curing the thermosetting adhesive. Thus, several cured products (for example three cured products of 0.7 $M_{AH}$, 0.75 $M_{AH}$, and 0.8 $M_{AH}$) each having a small amount of the blocked isocyanate are prepared as samples for measurement, dynamic viscoelasticity spectrum is measured for these samples, and the sample having the largest content of blocked isocyanate among those samples failing to show a peak derived from the softening temperature of the phenoxy resin can be determined as having a suitable mixing amount of the blocked isocyanate.

When two steel plates are caused to adhere to each other under conditions (1) to (4) below using the thermosetting adhesive, the shear adhesive force at 150° C. of the adhesive component of such a thermosetting adhesive that is exerted between the steel plates under all these conditions is preferably 1.5 MPa more, more preferably 15 MPa or more. Further, when two steel plates are caused to adhere to each other under the conditions (1) to (4) below using the thermosetting adhesive, the shear adhesive force at 200° C. of the adhesive component that is exerted between the steel plates under all these conditions is preferably 0.8 MPa or more, more preferably 3.5 MPa or more:

(1) 100° C.×6 hours,
(2) 110° C.×3 hours,
(3) 150° C.×10 minutes, and
(4) 180° C.×5 minutes.

The polyurethane can be constituted by a polyol having two or more hydroxy groups in one molecule, and a polyisocyanate having two or more isocyanate groups in one molecule. Use of the polyol and the polyisocianate any of which has a carboxyl group enables a carboxyl group to introduce in an obtained polyurethane. It is preferable that the carboxyl group be provided in the polyol. As the polyol having a carboxyl group, for example, a hydroxycarboxylic acid having 5 to 20 carbon atoms is suitable, and examples of the hydroxycarboxylic acid include 3,5-dihydroxybenzoic acid, 2,2-bis(hydroxymethyl) propionic acid, 2,2-bis(hydroxymethyl) butanoic acid, 2,2-bis(2-hydroxyethyl) propionic acid, 2,2-bis(3-hydroxypropyl) propionic acid, bis(hydroxymethyl) acetic acid, bis(4-hydroxyphenyl) acetic acid, 2,2-bis(hydroxymethyl) butyric acid, 4,4-bis(4-hydroxyphenyl) pentanoic acid, tartaric acid, and N,N-dihydroxyethylglycine. Among these, a polyol for introducing a carboxyl group in the polyurethane is preferably dimethylolpropanoic acid or dimethylolbutanoic acid, particularly preferably dimethylolpropanoic acid.

It is preferable that the polyurethane include a polyol having no carboxyl group as a constituent unit thereof in order to adjust the proportion of the carboxyl group. Specific examples of such a polyol include a general polyester polyol, a polyether polyol, a polycarbonate polyol, and other polyols.

Specific examples of the polyester polyol include polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, polybutylene isophthalate diol, polycaprolactone diol, and poly-3-methylvalerolactone diol. The polyester polyol is more excellent in heat resistance than a polyether polyol. Thus, the polyester polyol is more advantageous than the polyether polyol in order to obtain an adhesive layer excellent in heat resistance.

Specific examples of the polyether polyol include polyethylene glycol, polypropylene glycol, polytetramethylene glycol, and random/block copolymers thereof. The polyether polyol is more excellent in hydrolysis resistance than a polyester polyol. Thus, the polyether polyol is more advantageous than the polyester polyol in order to obtain an adhesive layer excellent in hydrolysis resistance.

Specific examples of the polycarbonate polyol include polytetramethylene carbonate diol, polypentamethylene carbonate diol, polyneopentyl carbonate diol, polyhexamethylene carbonate diol, poly(1,4-cyclohexanedimethylene carbonate)diol, and random/block copolymers thereof. The polycarbonate polyol is excellent in hydrolysis resistance and heat resistance, and can thus be suitably used as a polyol. Among the polycarbonate polyols, polyhexamethylene carbonate is suitable.

Specific examples of the other polyols include a dimer diol and a hydrogenated product thereof, a polybutadiene polyol and a hydrogenated product thereof, and a polyisoprene polyol and a hydrogenated product thereof. Among these, a diol obtained from the hydrogenated product of a dimer diol or the hydrogenated product of a polybutadiene polyol is excellent in hydrolysis resistance and heat resistance similar to a polycarbonate diol, and thus can be suitably used as a polyol. Note that the polyols having no carboxyl group can be individually used, or two or more of them can be used in combination.

The number average molecular weight (Mn, according to the terminal functional group quantification method) of each of these polyols is not particularly limited, but is preferably 500 to 6000. When the number average molecular weight (Mn) of the polyol is too large, the cohesive force of the urethane bond is difficult to develop, and the mechanical properties of the epoxy-modified polyurethane resin tend to decrease.

A short chain diol having a molecular weight of less than 500 may employed for the polyol, as appropriate. Specific examples of the short chain diol include aliphatic glycols such as ethylene glycol, 1,2-propylene glycol, 1,3-propylene glycol, 1,3-butylene glycol, 1,4-butylene glycol, 1,6-hexamethylene glycol, and neopentyl glycol, and their alkylene oxide low molar adducts (with a number average molecular weight of less than 500 according to the terminal functional group quantification method); alicyclic glycols such as 1,4-bishydroxymethylcyclohexane and 2-methyl-1,1-cyclohexanedimethanol, and their alkylene oxide low molar adducts (with a number average molecular weight of less than 500 according to the same as above); aromatic glycols such as xylylene glycols, and their alkylene oxide low molar adducts (with a number average molecular weight of less than 500 according to the same as above); and alkylene oxide low molar adducts (with a number average molecular weight of less than 500 according to the same as above) of bisphenols such as bisphenol A, thiobisphenol, and sulfone bisphenol. As the short chain diol, ethylene glycol, 1,3-propylene glycol, 1,3-butylene 1,4-butylene glycol, 1,6-hexamethylene glycol, neopentyl glycol, or the like is preferable, and ethylene glycol, 1,3-butylene glycol, and 1,4-butylene glycol are particularly preferable. These short chain diols can be used individually, or two or more of them can be used in combination.

The polyol may include a polyhydric alcohol-based compound, as appropriate. Specific examples of the polyhydric alcohol-based compound include glycerin, trimethylolethane, trimethylolpropane, pentaerythritol, tris-(2-hydroxyethyl) isocyanurate, 1,1,1-trimethylolethane, and 1,1,1-trimethylolpropane.

As the polyisocyanate constituting a polyurethane together with these polyols, a conventionally known polyisocyanate can be used. Specific examples of the polyisocyanate include aromatic diisocyanates such as toluene-2,4-diisocyanate, toluene 2,6-diisocyanate, their mixture, 4-methoxy-1,3-phenylenediisocyanate, 4-isopropyl-1,3-phenylenediisocyanate, 4-chloro-1,3-phenylenediisocyanate, 4-butoxy-1,3-phenylenediisocyanate, 2,4-diisocyanate diphenyl ether, 4,4'-methylenebis(phenyleneisocyanate) (MDI) and crude or polymeric MDI, durylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylenediisocyanate, 4,4'-methylenebis (cyclohexyl isocyanate), 1,5-tetrahydronaphthalene diisocyanate, isophorone diisocyanate, and hydrogenated XDI; and polyurethane prepolymers obtained by causing these diisocyanates and low molecular-weight polyols to react with each other so as to have an isocyanate at a terminal.

Among these, the polyisocyanate is preferably an aromatic isocyanate in terms of obtaining an adhesive that is industrially stably available at a low price and excellent in heat resistance. The polyisocyanate is particularly preferably toluene-2,4-diisocyanate, toluene-2,6-diisocyanate, their mixture, 4,4'-methylenebis(phenylene isocyanate) (MDI), and crude or polymeric MDI. These polyisocyanates can be individually used, or two or more of them can be used in combination.

It is preferable that the polyurethane constituted by the polyisocyanate and the polyol include a carboxyl group to have a have a certain acid value in consideration of reactivity (crosslinking density) with an epoxy. Specifically, the polyurethane preferably has an acid value of 5 to 30 mgKOH/g, more preferably has an acid value of 9 to 25 mgKOH/g. The acid value of the polyurethane can be measured according to the method described in JIS K1557-5: 2007 by solubilizing the polyurethane with methyl ethyl ketone (MEK) or the like.

As the epoxy constituting the epoxy-modified urethane resin together with the polyurethane, a general epoxy can be individually used, or a plurality of general epoxies can be mixed together for use. Examples of the epoxy include a novolac type epoxy such as a phenol novolac type epoxy or a cresol novolac type epoxy; and a bisphenol type epoxy such as a bisphenol A type epoxy or a bisphenol F type epoxy.

As the blocked isocyanate constituting the epoxy-modified urethane resin together with the epoxy and the polyurethane, a blocked isocyanate having the isocyanate group of the polyisocyanate blocked by a blocking agent can be employed. The blocking agent is not particularly limited as long as it is a blocking agent that dissociates from the isocyanate group by being heated, and the blocking agent may be used individually or a plurality of blocking agents may be mixed together for use. Examples of the blocking agent include an oxime-based compound, an alcohol-based compound, a phenolic compound, an active methylene-based compound, an amine-based compound, an imine-based compound, a carbamate-based compound, a urea-based compound, an acid amide-based (lactam-based) compound, an acid imide-based compound, a triazole-based compound, a pyrazole-based compound, an imidazole-based compound, an imidazoline-based compound, a mercaptan-based compound, and a bisulfite.

Examples of the oxime-based compound include formaldoxime, acetaldoxime, acetoxime, methyl ethyl ketone oxime, cyclohexanone oxime, diacetyl monoxime, penzophenoxime, 2,2,6,6-tetramethylcyclohexanone oxime, diisopropyl ketone oxime, methyl t-butyl ketone oxime, diisobutyl ketone oxime, methyl isobutyl ketone oxime, methyl isopropyl ketone oxime, methyl 2,4-dimethylpentyl ketone oxime, methyl 3-ethyl heptyl ketone oxime, methyl isoamyl ketone oxime, n-amyl ketone oxime, 2,2,4,4-tetramethyl-1,3-cyclobutanedione monoxime, 4,4'-dimethoxybenzophenone oxime, and 2-heptanone oxime.

Examples of the alcohol-based compound include methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-ethylhexyloxyethanol, 2-butoxyethylethanol, 2-butoxyethoxyethanol, N,N-dibutyl-2-hydroxyacetamide, N-hydroxysuccinimide, N-morpholine ethanol, 2,2-dimethyl-1,3-dioxolane-4-methanol, 3-oxazolidine ethanol, 2-hydroxymethylpyridine, furfuryl alcohol, 12-hydroxystearic acid, triphenylsilanol, and 2-hydroxylethyl methacrylate.

Examples of the phenolic compound include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropyl cresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methyl salicylate, methyl 4-hydroxybenzoate, benzyl 4-hydroxybenzoate, 2-ethylhexyl hydroxybenzoate, 4-[(dimethylamino)methyl] phenol, 4-[(dimethylamino)methyl] nonylphenol, bis(4-hydroxyphenyl)acetic acid, pyridinol, 2- or 8-hydroxyquinoline, 2-chloro-3-pyridinol, and pyridin-2-thiol.

Examples of the active methylene-based compound include Meldrum's acid, as dialkyl malonate (for example, dimethyl malonate, diethyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, methyl diethyl malonate, dibenzyl malonate, diphenyl malonate, benzylmethyl malonate, ethylphenyl malonate, t-butylphenyl malonate, and isopropylidene malonate), an alkyl acetoacetate (for example, methyl acetoacetate, ethyl acetoacetate, n-propyl acetoacetate, isopropyl acetoacetate, n-butyl acetoacetate, t-butyl acetoacetate, benzyl acetoacetate, and phenyl acetoacetate), 2-acetoacetoxyethylmethacrylate, acetylacetone, and ethyl cyanoacetate.

Examples of the amine-based compound include dibutylamine, diphenylamine, aniline, N-methylaniline, carbazole, bis(2,2,6,6-tetramethylpiperidinyl)amine, di-n-propylamine, diisopropylamine, isopropylethylamine, 2,2,4- or 2,2,5-trimethylhexamethyleneamine, N-isopropylcyclohexylamine, dicyclohexylamine, bis(3,5,5-trimethylcyclohexyl) amine, piperidine, 2,6-dimethylpiperidine, 2,2,6,6-tetramethylpiperidine, (dimethylamino)-2,2,6,6-tetramethylpiperidine, 2,2,6,6-tetramethyl-4-piperidine, 6-methyl-2-piperidine, and 6-aminocaproic acid.

Examples of the imine-based compound include ethyleneimine, polyethyleneimine, 1,4,5,6-tetrahydropyrimidine, and guanidine.

Examples of the carbamate-based compound include phenyl N-phenylcarbamate.

Examples of the urea-based compound include urea, thiourea, and ethylene urea.

Examples of the acid amide-based (lactam-based) compound include acetanilide, N-methylacetamide, acetamido, ε-caprolactam, δ-valerolactam, γ-butyrolactam, pyrrolidone, 2,5-piperazinedione, and laurolactam.

Examples of the acid imide-based compound include succinimide, maleimide, and phthalimide.

Examples of the triazole-based compound include 1,2,4-triazole and benzotriazole.

Examples of the pyrazole-based compound include pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole.

Examples of the imidazole-based compound include imidazole, benzimidazole, 2-methylimidazole, 4-methylimidazole, 2-ethylimidazole, 2-isopropylimidazole, 2,4-dimethylimidazole, 2-ethyl-4-methylimidazole, 2-phenylimidazole, and 4-methyl-2-phenylimidazole.

Examples of the imidazoline-based compound include 2-methylimidazoline and 2-phenylimidazoline.

Examples of the mercaptan-based compound include butyl mercaptan, dodecyl mercaptan, and hexyl mercaptan.

Examples of the bisulfite include sodium bisulfite

Further, the blocking agent may be, for example, benzoxazolone, isatoic anhydride, tetrabutylphosphonium acetate, phenol, alcohol, oxime, and lactam.

It is preferable that the blocking agent be a phenolic compound or an oxime compound among those above. The blocking agent is selected so that the storage temperature and the thermosetting temperature of the thermosetting adhesive to be mixed therewith are adjusted to the desorption temperature of the blocking agent. The phenol compound or the oxime compound is preferable since the thermosetting adhesive including the compound has high ordinary temperature preservability and the blocking agent desorbs the compound at a low temperature to enable low-temperature thermosetting. The oxime compound is particularly desirable since it exhibits favorable wettability to an adherend (in this embodiment the positive electrode terminal 20 and the negative electrode terminal 30) and has favorable penetration into minute portions. Representative examples of the oxime compound include methyl ethyl ketone oxime.

As the phenoxy resin that constitutes the adhesive component of the thermosetting adhesive together with the epoxy-modified urethane resin formed of the blocked isocyanate the polyurethane, and the epoxy, a resin having a relatively low softening point is suitable in terms of exhibiting good toughness to the cured product of the thermosetting adhesive. Specifically, it is preferable that the phenoxy resin have a softening temperature of 50° C. or more and 90° C. or less. The softening temperature of the phenoxy resin is determined by the ring and ball method of JIS K 7234 "Testing Methods for Softening Point of Epoxide Resins": 1986. Such a phenoxy resin having a low softening temperature is particularly effective for exhibiting toughness to the cured product of the thermosetting adhesive, but may reduce the heat resistance of the cured product. However, the thermosetting adhesive of this embodiment can cause the cured product to be hardly affected by such a phenoxy resin, and thus enables both the characteristics resulting from the toughness of the phenoxy resin and the heat resistance of the epoxy-modified polyurethane resin to coexist therein.

The phenoxy resin may have an epoxy group. It is preferable that the phenoxy resin be a bisphenol A type phenoxy resin having a certain epoxy equivalent. The phenoxy resin can more reliably exhibit excellent heat resistance to the adhesive layer when it has an epoxy equivalent of 5000 g/eq or more. The epoxy equivalent of the phenoxy resin is further preferably 7000 g/eq or more. The epoxy equivalent of the phenoxy resin is usually 30000 g/eq or less. The epoxy equivalent can be determined by the method described in JIB K7236: 2001.

It is preferable that the thermosetting adhesive include 5 mass parts or more and 40 mass parts or less of the epoxy based on 100 mass parts of the polyurethane. It is preferable that the thermosetting adhesive include 15 mass parts or more and 60 mass parts or less of the phenoxy resin based on 100 mass parts of the polyurethane. The content of the epoxy is more preferably 10 mass parts or more, still more preferably 15 mass parts or more, based on 100 mass parts of the polyurethane. The content of the epoxy is more preferably 30 mass parts or less, still more preferably 25 mass parts or less, based on 100 mass parts of the polyurethane. The content of the phenoxy resin is more preferably 20 mass parts or more, still more preferably 25 mass parts or more, based on 100 mass parts of the polyurethane. The content of the phenoxy resin is more preferably 45 mass parts or less, still more preferably 40 mass parts or less, based on 100 mass parts of the polyurethane.

It is preferable that the thermosetting resin include 2 mass parts or more and 10 mass parts or less of the blocked isocyanate when the total amount of the polyurethane, the epoxy, and the phenoxy resin is 100 mass parts.

The adhesive component of the thermosetting adhesive may include a filler together with the epoxy-modified polyurethane resin and the like, in order to allow the thermosetting adhesive to exert an excellent cohesive force. Examples of the filler include short fibers and particles made of an organic material or an inorganic material. Among these, particles (inorganic filler) made of an inorganic material such as silica, alumina, calcium carbonate, talc, or clay is suitable as a filler to be included in the thermosetting adhesive. In particular, it is preferable that the adhesive component of the thermosetting adhesive include the inorganic filler having an average particle size of 0.5 μm or more and 2 μm or less together with the epoxy-modified polyurethane resin and the like. The average particle size of the inorganic filler can be generally determined as the median value (D50) in the volume-based cumulative particle size distribution curve measured by laser diffraction scattering.

These fillers can be used individually, or two or more of them can be used in combination. The content of the filler in the thermosetting adhesive can be, for example, 10 mass parts or more and 60 mass parts or less, and is preferably 15 mass parts or more and 55 mass parts or less, more preferably 20 mass parts or more and 50 mass parts or less, based on 100 mass parts of the epoxy-modified polyurethane resin.

The thermosetting adhesive in which the phenoxy resin is included exhibits its excellent flexibility, allowing the first adhesive layer 41 and the second adhesive layer 42 to exhibit excellent abrasion resistance even when the thermosetting adhesive includes the inorganic filler. For example, it is preferable that the adhesive sheet 40 of this embodiment have no abrasion powder occurring when at least one of the first adhesive layer 41 and the second adhesive layer 42 is subjected to scrape abrasion according to ISO 6722 by reciprocation three times. It is preferable that, when a scrape abrasion test is performed for both of the first adhesive layer 41 and the second adhesive layer 42, the adhesive sheet 40 of this embodiment have no abrasion power occurring until a scraper is reciprocated at least three times. The scrape abrasion can be performed, for example, using a tester (model: 5420-7N) manufactured by TVAB. In the scrape abrasion test, a test object can be made by attaching the adhesive sheet 40 around the outer circumferential surface of a metal rod having a diameter of 5 mm to have the first adhesive layer 41 or the second adhesive layer 42 (i.e., the surface subjected to abrasion resistance evaluation) being an outer surface side. In the scrape abrasion test, a scraper equipped with a piano wire having a diameter of 0.45 mm is brought into contact with the test object so as to allow the piano wire to be orthogonal to the metal rod, and is reciprocated along the length direction of the metal rod at a stroke length of 22 mm and at a speed of 3 m/min. The scrape abrasion test is performed so that the tip of the scraper applies a load of 1039 gf to the test object (i.e., the surface of the first adhesive layer 41 or the second adhesive layer 42), and that the tip of the scraper (i.e., an area of 0.45 mm×7 mm) is applied with a pressure of 3.2 MPa.

It is preferable that the thermosetting adhesive be excellent in flexural modulus, taking into account the possibility that the adhesive sheet is interposed not only in a flat space but also in an angular space. The thermosetting adhesive can exhibit excellent flexural modulus to the first adhesive layer 41 and the second adhesive layer 42. It is preferable that the thermosetting adhesive be not separated from the base layer 30 even when the adhesive sheet 40 is bent at 90 degrees at ambient temperature (30° C.) so that the first adhesive surface 40*a* is folded inward and the second adhesive surface 40*b* is folded outward, or is bent at 90 degrees so that the first adhesive surface 40*a* is folded outward and the second adhesive surface 40*b* is folded inward. It is further preferable that the thermosetting adhesive be not separated even when the adhesive sheet 40 of this embodiment is folded in half (i.e., bent at 180 degrees) to have the first adhesive surface 40*a* facing inward or is folded in half (i.e., bent at 180 degrees) to have the second adhesive surface 40*b* facing inward.

When the inorganic filler is included in the thermosetting adhesive, it preferable that a silane coupling agent be included as the additive in order to increase affinity between the inorganic filler and the resin and allow the adhesive layer to exhibit the abrasion resistance or the flexural modulus as described above. As the silane coupling agent, a substance composed of a molecule with one terminal provided with an alkoxysilane and the other terminal provided with an epoxy group is preferable, and specifically, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, or the like is preferable. The silane coupling agent can be included in the thermosetting adhesive in a proportion of 5 mass parts or more and 20 mass parts or less when the content of the inorganic filler is 100 mass parts.

Examples of the additive that can be included in the thermosetting adhesive other than the silane coupling agent include an antioxidant (e.g., hindered phenol-based, phosphite-based, thioether-based), a light stabilizer (e.g., hindered amine-based), an ultraviolet absorber (e.g., benzophenone-based, benzotriazole-based), a gas discoloration stabilizer (e.g., hydrazine-based), and a metal inert agent. These additives can be used individually, or two or more of them can be used in combination.

Examples of the foaming agent component to be included in the thermosetting adhesive include a foaming agent with the chemical foaming system that causes a reaction and generates a gas when heated, and a foaming agent with the physical foaming system such as microcapsules which a physical foaming agent is encapsulated. Examples of the foaming agent with the chemical foaming system include an inorganic foaming agent such as sodium bicarbonate, sodium carbonate, ammonium bicarbonate, ammonium carbonate, or ammonium nitrite; and an organic foaming agent such as azodicarbonamide (ADCA), N,N'-dinitrosopentamethylenetetramine, benzenesulfonylhydrazide, or 4,4'-diphenyldisulfonylazide.

Examples of the foaming agent with the physical foaming system include a foaming agent of the type that has a physical foaming agent such as a hydrocarbon, e.g., n-pentane, isopentane, isobutane, or petroleum ether, or a halide thereof encapsulated in capsules made of various thermoplastic resins. Thermally expandable microcapsules in which the physical foaming agent is encapsulated are suitable in that the foaming start temperature is easily controlled.

These foaming agents can be used individually, or two or more of them can be used in combination. As the foaming agent component, it is preferable to employ the thermally expandable microcapsules. Particularly, it is preferable that the thermosetting adhesive of this embodiment include at least two kinds of thermally expandable microcapsules respectively having different foaming start temperatures from each other. In the expansion by the thermally expandable microcapsules, the thermosetting adhesive tends to slightly shrink after expanding to the maximum volume, but the inclusion of at least two kinds of thermally expandable microcapsules as described above can suppress the shrinkage. Further, including two kinds of thermally expandable microcapsules is effective in suppressing a significant variation in the foaming state of the adhesive layer due to a difference in heating conditions.

The foaming start temperature of the foaming agent is preferably 60° C. or more and 170° C. or less, more preferably 80° C. or more and 160° C. or less.

The content of the foaming agent in the thermosetting adhesive can be, for example, 8 mass parts or more and 60 mass parts, and is preferably 10 mass parts or more and 55 mass parts or less, more preferably 20 mass parts or more and 45 mass parts or less, based on 100 mass parts of the adhesive component.

The first adhesive layer 41 and the second adhesive layer 42 may be formed of the same thermosetting adhesive, or may be respectively formed of different thermosetting adhesives. The first adhesive layer 41 and the second adhesive layer 42 may have the same thickness or different thicknesses. The thickness of the first adhesive layer 41 and the second adhesive layer 42 is generally 5 μm or more and 100 μm or less, respectively, and is preferably 10 μm or more and 80 μm or less, more preferably 20 μm or more and 70 μm or less.

The adhesive sheet 40 of this embodiment before being caused to foam by the foaming agent component has a smaller thickness than the shortest distance between the surface of the positive electrode terminal 20 and the surface of the negative electrode terminal 30 (hereinafter referred to also as "gap between terminals"), and is configured to allow the first adhesive layer 41 and the second adhesive layer 42 to expand in the thickness direction and enable the first adhesive surface 40*a* and the second adhesive surface 40*b* to be thermally bonded respectively to the positive electrode terminal 20 and the negative electrode terminal 30 when the adhesive sheet 40 is heated while being interposed between the terminals.

It is preferable that at least one of the first adhesive layer 41 and the second adhesive layer 42 after being caused to foam and heat-cured have a thickness reduction ratio of 1% or less when being subjected to a heating treatment at 200° C. for 100 hours, and it is more preferable that the thickness reduction ratios of both the first adhesive layer 41 and the second adhesive layer 42 be 1% or less.

It is preferable that, when the component from which the foaming agent component has been removed is used in a non-foamed state to cause two steel plates to adhere to each other as described above, the thermosetting adhesive constituting at least one of the first adhesive layer 41 and the second adhesive layer 42 have a shear adhesive force at 200° C. of 3.5 MPa or more that is exerted between the steel plates. The shear adhesive force at 200° C. of the adhesive component alone without the foaming agent component is preferably 4.0 MPa or more, particularly preferably 4.5 MPa or more. The shear adhesive force is generally 50 MPa or less. It is desirable that the thermosetting adhesive having such a shear adhesive force be used as a constituent material of both the first adhesive layer 41 and the second adhesive layer 42.

The above shear adhesive force can be measured by a tensile tester equipped with a thermostat bath, and can be measured at a tensile speed of 5 mm/min. A test piece for measuring the shear adhesive force at 200° C. is prepared as follows. First, two strip-shaped metal pieces each having a width of 15 mm, a length of 100 mm and a thickness of 1.0 mm and made of an SPC steel plate are prepared, and a sheet piece (having a thickness of about 50 μm) having a size of 10 mm×15 mm made only of the adhesive component without the foaming agent component is prepared. The two strip-shaped metal pieces are vertically superposed on each other to have their contours coinciding with each other, the two-strip-shaped metal pieces in this state are relatively moved in the longitudinal direction to reduce an area in which the two metal pieces overlap each other, and the strip-shaped metal pieces are positionally fixed relative to each other when the length of the overlapping area is 10 mm. The sheet piece made of the adhesive component is placed between the two strip-shaped metal pieces in the area in which the metal pieces overlap each other, followed by being hot-pressed to cause the two strip-shaped metal pieces to adhere to each other with the sheet piece. This is used as a test piece for the tensile test. At this time, the sheet piece is brought into a state of being sufficiently heat-cured (e.g., heated at 150° C. for 15 minutes or more). Then, the test piece is placed in the thermostat bath set to 200° C., and the strip-shaped metal pieces are respectively held by the upper and lower chucks of the tensile tester arranged in the thermostat bath. The tensile test is performed after the test piece in this state reaches a temperature of 200° C., and the shear adhesive force is obtained by dividing the maximum load (N) measured in the tensile test by the adhesive area (150 mm$^2$). The shear adhesive force is generally obtained as the arithmetic average of the values measured for a plurality of (for example, five) test pieces.

The thermosetting adhesive having the adhesive component exerts the aforementioned excellent shear adhesive force, and can thus exert an excellent shear adhesive force even in the state of being foamed by the foaming agent component.

In order to allow the adhesive sheet 40 to exhibit excellent heat resistance, it is preferable that the base layer 43 serving as a support body for the first adhesive layer 41 and the second adhesive layer 42 be formed of a film made of a heat-resistant resin, a fiber sheet made of a heat-resistant resin, or a composite sheet thereof. The adhesive sheet 40 of this embodiment is preferably formed of a composite sheet having a laminated structure as shown in FIGS. 3A and 3B to exhibit excellent heat resistance and electric insulating properties. More specifically, the base layer 43 in this embodiment has heat-resistant resin fiber sheets 432 respectively attached to both surfaces of a heat-resistance resin film 431 via adhesive layers 433, and thus has a five-layered structure. As the heat-resistant resin film 431, for example, a polyethylene naphthalate resin film or a polyimide resin film having a thickness of 10 μm to 100 μm is preferable. Each of the heat-resistant resin fiber sheets 432 is preferably, for example, an aromatic polyamide fiber sheet or a polyether sulfone fiber sheet having a thickness of 10 μm to 100 μm. Among these, an aromatic polyamide fiber sheet called, for example, aramid paper is suitable as the heat-resistant resin fiber sheet 432. The adhesive layers 433 may be made of, for example, an acrylic adhesive excellent in heat resistance. If necessary, the adhesive layers 433 may be formed of a component obtained by removing a foaming agent from the thermosetting adhesive forming the first adhesive layer 41 and the second adhesive layer 42.

The base layer 43 preferably has a total thickness of 50 μm to 200 μm. The total thickness of the adhesive sheet 40 including the base layer 43 and the adhesive layers (41 and 42) is preferably 100 μm to 250 μm. The adhesive sheet 40 has a volume resistivity determined according to JIS K6911 that is preferably $1\times10^{12}$ Ω·cm or more, more preferably $1\times10^{13}$ Ω·cm or more. The volume resistivity of the adhesive sheet 40 is generally $1\times10^{17}$ Ω·cm or less.

The adhesive sheet 40 has a breakdown voltage determined according to JIS C2110-1 (short-time (quick boost) test) that is AC 2 kVrms or more, more preferably AC 3 kVrms or more. The breakdown voltage of the adhesive sheet 40 is generally AC 20 kVrms or less.

The adhesive sheet 40 of this embodiment is interposed between the positive electrode terminal 20 and the negative electrode terminal 30, followed by being heated, to thereby exert a function of causing the positive electrode terminal 20 and the negative electrode terminal 30 to adhere to each other. The adhesive sheet 40 of this embodiment can more reliably exert the function when the average distance between the positive electrode terminal 20 and the negative electrode terminal 30 is 50 μm or more and 500 μm or less. The average distance between the positive electrode terminal 20 and the negative electrode terminal 30 that is more suitable for use of the adhesive sheet 40 of this embodiment is 300 μm or more and 500 μm or less. The average distance between the positive electrode terminal 20 and the negative electrode terminal 30 can be determined by measuring a distance from the surface of the positive electrode terminal 20 to the surface of the negative electrode terminal 30 at each of at least 10 locations of the terminals between which the adhesive sheet 40 is interposed, and then arithmetically averaging the obtained measured values. In order to cause the positive electrode terminal 20 and the negative electrode terminal 30 to adhere to each other, the positive electrode terminal 20, the adhesive sheet 40, and the negative electrode terminal 30, which have been set into a specific state, may be prepared and retained in an oven set at a temperature equal to or higher than the foaming start temperature of the foaming agent (for example 180° C. or more) for a certain period of time for heating.

At this time, the first adhesive layer 41 and the second adhesive layer 42 volumetrically expand, and thus the adhesive sheet 40 of this embodiment enables the positive electrode terminal 20 and the negative electrode terminal 30 to adhere to each other with a high adhesive force. The first adhesive layer 41 and the second adhesive layer 42, which have been foamed by the foaming agent and hence volumetrically expanded, hardly have their adhesive force reduced even in a high temperature environment (for example 200° C.), and moreover hardly have their thickness reduced by, for example, shrinkage even if they are exposed to the high temperature environment for a long period of time (for example, 100 hours); thus, the adhesive sheet 40 of this embodiment can exhibit good adhesion state between the positive electrode terminal 20 and the negative electrode terminal 30 in a continuous manner for a long period of time.

The adhesive sheet 40 of this embodiment exerts an excellent shear adhesive force even under the high temperature environment (for example 200° C.) after the first adhesive layer 41 and the second adhesive layer 42 are foamed by the foaming agent, and can thus prevent inadvertent elimination of the good adhesion between the positive electrode terminal 20 and the negative electrode terminal 30.

The first adhesive layer 41 and the second adhesive layer 42, which have excellent abrasion resistance and flexural modulus as described above, are hardly subjected to "separation" or "chipping" when the adhesive sheet 40 of this embodiment is inserted into a curved or bent portion. That is, the adhesive sheet 40 of this embodiment hardly causes a problem of causing powder of the thermosetting sheet to occur and be attached to portions other than necessary portions. It is therefore suitable not only for adhesion between the terminals of the semiconductor apparatus 1 but also for various other purposes.

Excellent in electric insulating properties, the adhesive sheet 40 can be, for example, used for a space-insulated portion of a semiconductor apparatus, such as an inverter or a converter. In such a case where a printed circuit board is fixed with a gap provided for the insulation of the space between the printed circuit board and an inner wall of a metal housing of the semiconductor apparatus, the adhesive sheet 40 is useful for adhesion and fixing of the printed circuit: board to the housing. Further, in such a case where a power unit including a power device is provided in the housing, the adhesive sheet 40 can be also effectively used for adhesion between the power unit and the housing.

In the case, for example, where the configuration is such that a metal plate for electromagnetic shielding is arranged between a power device for which the inerter powers on and off and a control board for controlling the on and off operations of the power device, a noise generated by the power device causes induced potential to occur in the metal plate, and electrical discharge occurs from the metal plate to the metal housing and the electricity can be induced through the housing to the ground when the induced potential exceeds a predetermined value, the adhesive sheet 40, which is excellent in electric insulating properties, can be used as an insulator interposed between the metal plate and the housing in order to keep constant a discharge distance therebetween. The adhesive sheet 40 can cause these to adhere to each other using its expansion force, and can thereby firmly fix the metal plate and the housing to each other. Further, the adhesive sheet 40 can exhibit excellent adhesiveness to firmly fix the metal plate and the housing to each other even under high temperature conditions. The use of the adhesive sheet 40 as described above can omit the use of fastening members such as screws for fixing parts together, and can therefore increase the effective space in the housing.

As described above, the adhesive sheet of the present invention can be used in various applications. This embodiment has been described by taking, for example, the adhesive sheet 40 provided with the base layer 43 having a layered structure in order to obtain secure insulation reliability between the positive electrode terminal 20 and the negative electrode terminal 30, but the base layer 43 may have a single-layered structure. Further, this embodiment has been described by taking, for example, the adhesive sheet 40 having a layered structure as a preferred embodiment of the adhesive sheet, but the adhesive sheet of the present invention may have a single-layered structure formed of the thermosetting adhesive.

Although a detailed description will be herein omitted, various modifications may be made to the adhesive sheet of the present invention without significantly impairing the effect of the present invention. That is, the adhesive sheet of the present invention is not limited to the above exemplifications at all.

The thermosetting adhesive and the adhesive sheet according to this embodiment are configured as described above, and thus has the following advantages.

That is, the present invention provides a thermosetting adhesive including an adhesive component, in which dynamic viscoelasticity spectrum of a cured product obtained by curing the thermosetting adhesive has a peak indicating a softening temperature in an area of 200° C. or higher and has no peak in an area of 160° C. or lower, the adhesive component includes a polyurethane, an isocyanate, and an epoxy to form an epoxy-modified polyurethane, and the adhesive component further includes a phenoxy resin.

Further, the present invention provides an adhesive sheet including: a base layer composed of a sheet-shaped base material; and an adhesive layer composed of the thermosetting adhesive as above, in which the adhesive layer is laminated on one side, or each of both sides, of the base layer.

According to the present invention, the thermosetting sheet having the advantages of both the heat resistance of the epoxy-modified polyurethane resin and the toughness of the phenoxy resin, and further an adhesive sheet hardly causing cracks or the like in an adhesive layer can be provided.

The thermosetting adhesive and the adhesive sheet according to the present invention are not limited to the aforementioned embodiment. Further, the thermosetting adhesive and the adhesive sheet according to the present invention are not limited by the aforementioned operational effects, either. Various modifications can be made to the thermosetting adhesive and the adhesive sheet according to the present invention without departing from the gist of the present invention.

EXAMPLES (Standard Formulation)

As a thermosetting adhesive of a standard formulation, a thermosetting resin including: (a) a polyurethane obtained by causing a plurality of polyols including 2,2-bis(hydroxymethyl)propionic acid (DMPA) to react with 4,4'-methylenebis(phenylene isocyanate) (MDI); (b) a bisphenol-type epoxy; (c) an isocyanate (a mixture of toluene-2, 4-diisocyanate, toluene-2,6-diisocyanate, and 4,4'-methylenebis(phenylene isocyanate)); and (d) a phenoxy resin was prepared.

(Reference Formulation)

Separately from that of the standard formulation above, a thermosetting adhesive including no phenoxy resin was prepared. That is, a thermosetting resin of a reference formulation composed only of (a) to (c) above was prepared.

(Variable Formulation)

A thermosetting adhesive of a variable formulation in which only (c) the isocyanate was reduced relative to the standard formulation was prepared. Specifically, the thermosetting adhesives in which the amount of (c) the isocyanate was reduced gradually to 0.95 times, 0.9 times, 0.85 times, 0.80 times, 0.75 times, and 0.7 times, respectively, as much as the amount of (c) the isocyanate of the standard formulation were prepared.

(Evaluation)

The measurements of dynamic viscoelasticity spectrum (temperature-loss tangent) and thermogravimetric differential thermal analysis (TG/DTA) were performed for cured products respectively obtained by curing the thermosetting adhesives of the standard formulation, the reference formulation, and any of the variable formulations at 170° C. for 30 minutes as a heating condition.

Figure 4:
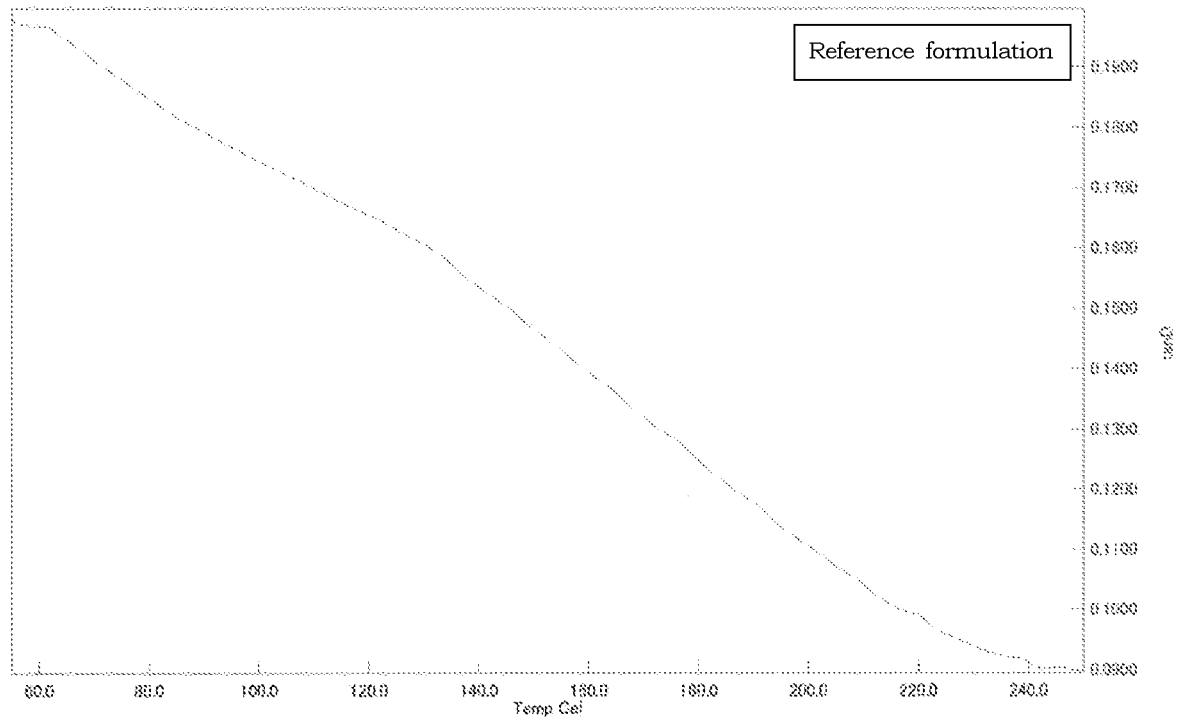
FIG. 4 is a view showing the measured result of the dynamic viscoelasticity spectrum of a cured product of a thermosetting adhesive (measured curve in a reference formulation).
Figure 5:
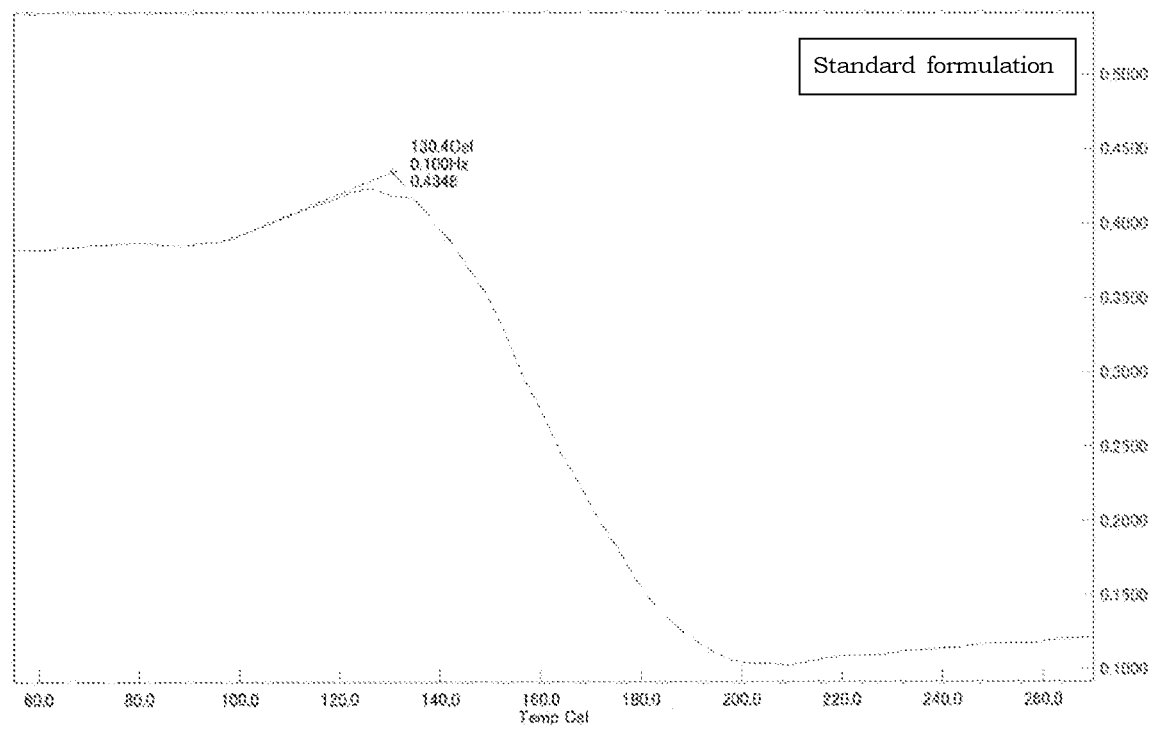
FIG. 5 is a view showing the measured result of the dynamic viscoelasticity spectrum of a cured product of a thermosetting adhesive (measured curve in a standard formulation).
Figure 6:
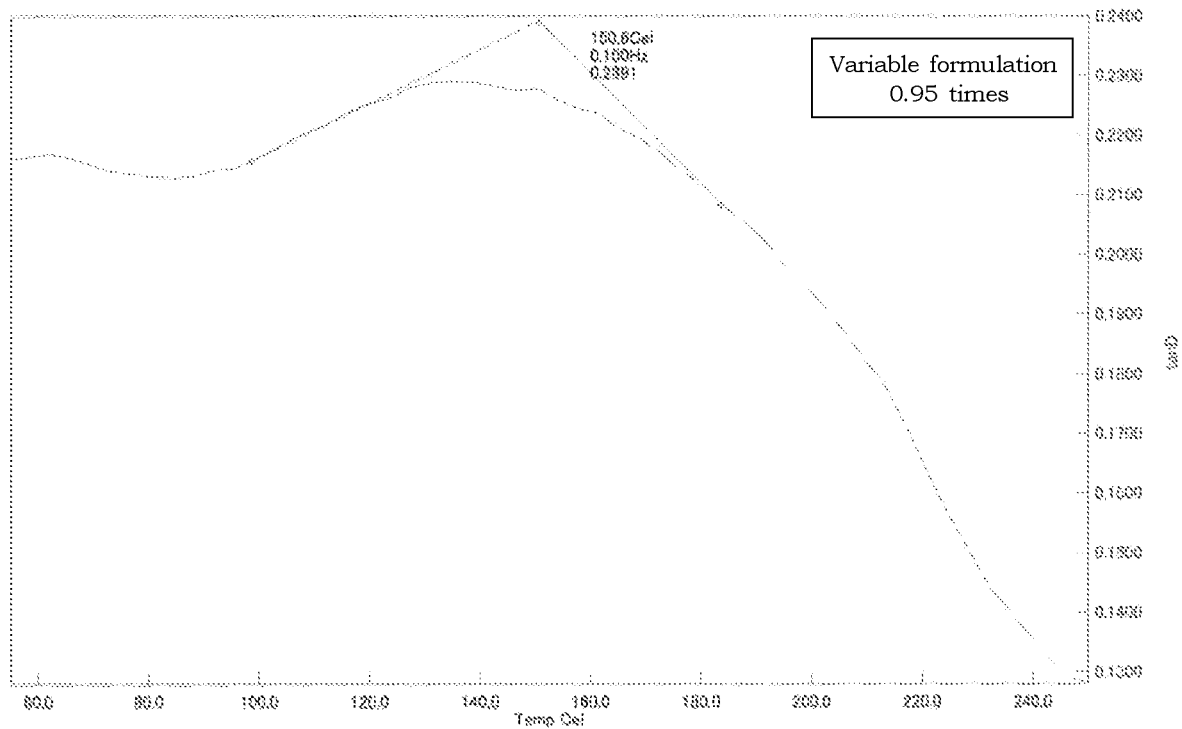
FIG. 6 is a view showing the measured result of the dynamic viscoelasticity spectrum of a cured product of a thermosetting adhesive (measured curve in a variable formulation (the content of an isocyanate is 0.95 times as much as the standard formulation)).
Figure 7:
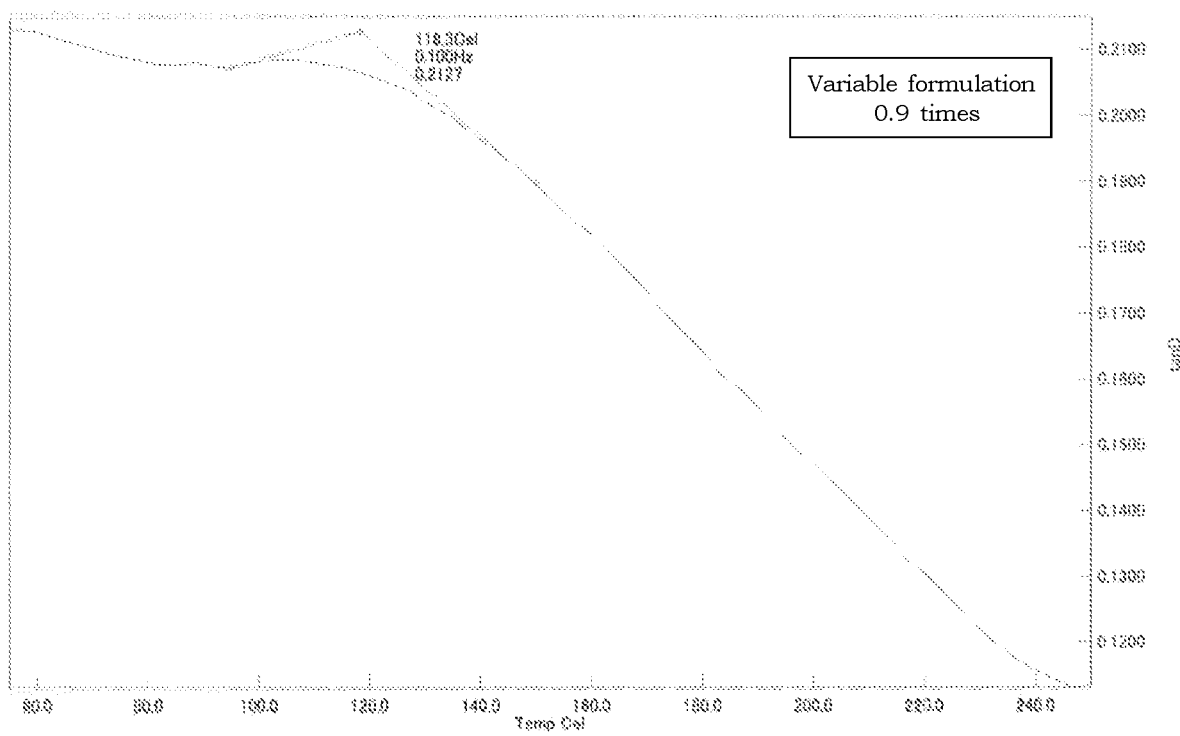
FIG. 7 is a view showing the measured result of the dynamic viscoelasticity spectrum of a cured product of a thermosetting adhesive (measured curve in a variable formulation (the content of an isocyanate is 0.9 times as much as the standard formulation)).
Figure 8:
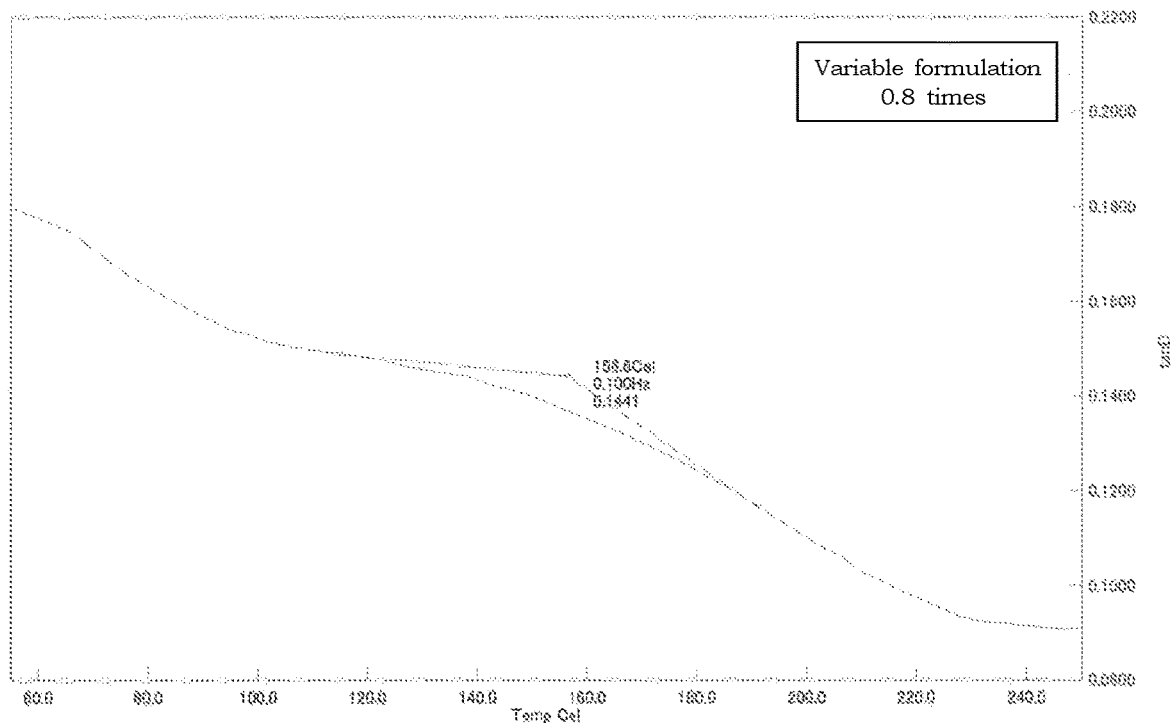
FIG. 8 is a view showing the measured result of the dynamic viscoelasticity spectrum of a cured product of a thermosetting adhesive (measured curve in a variable formulation (the content of an isocyanate is 0.8 times as much as the standard formulation)).
Figure 9:
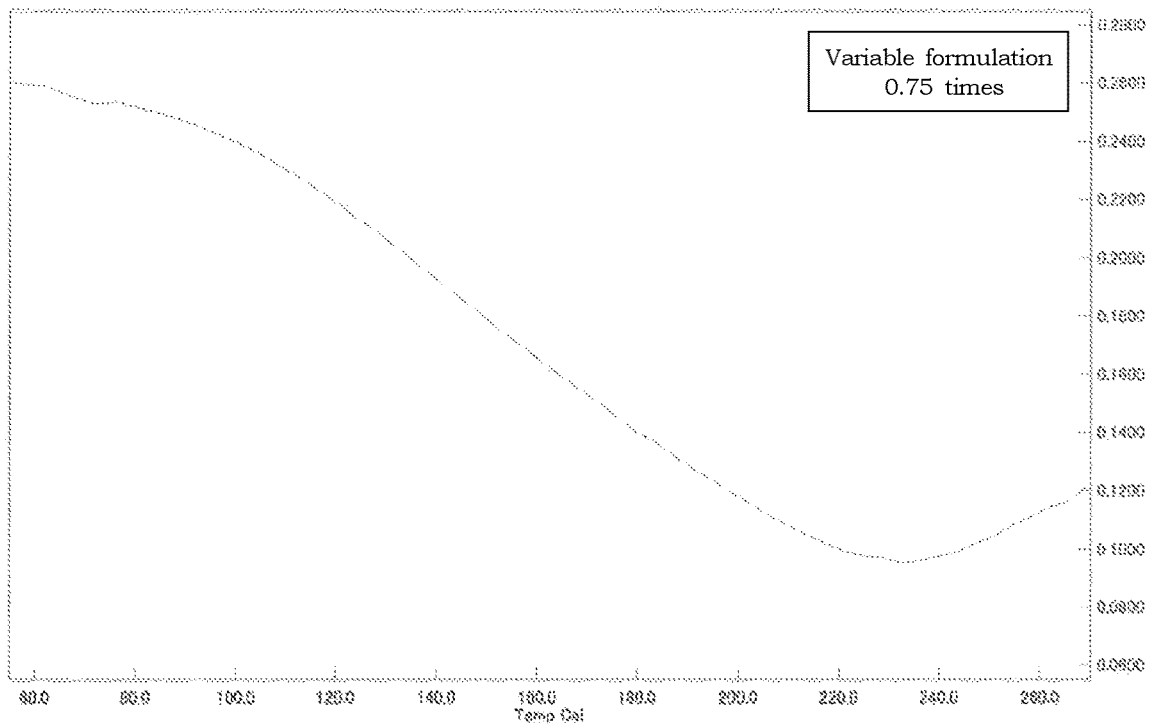
FIG. 9 is a view showing the measured result of the dynamic viscoelasticity spectrum of a cured product of a thermosetting adhesive (measured curve at a variable formulation (the content of an isocyanate is 0.75 times as much as the standard formulation)).
Figure 10:
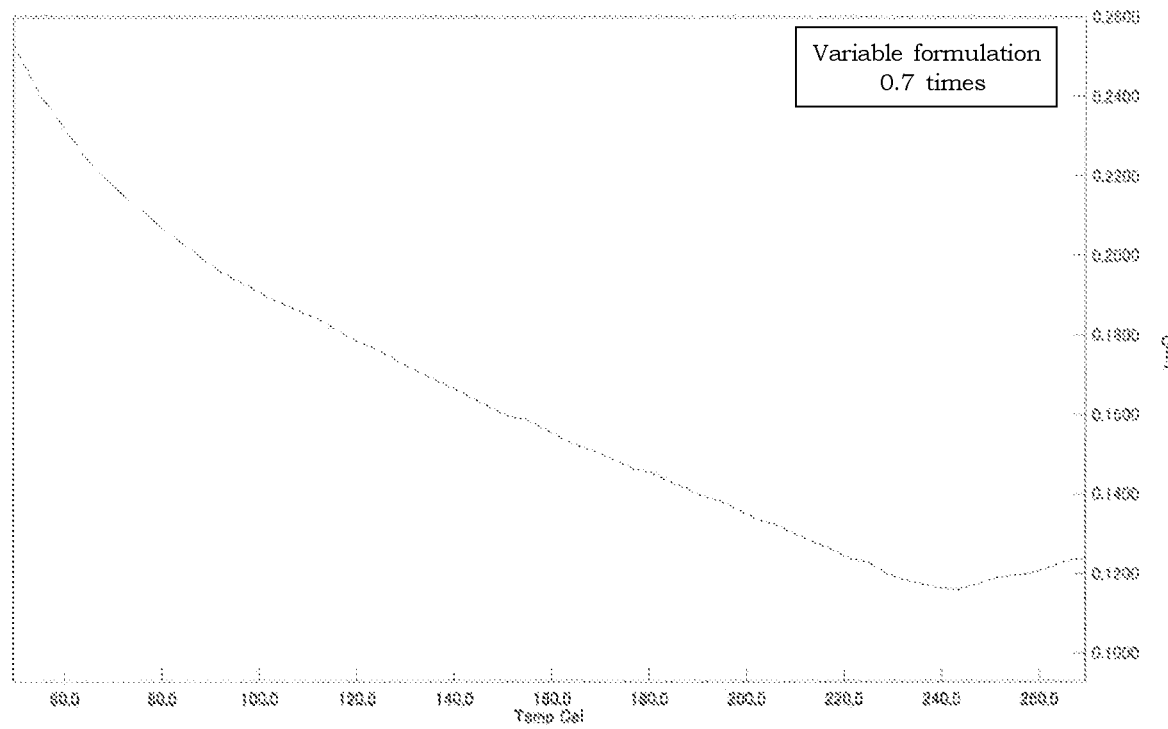
FIG. 10 is a view showing the measured result of the dynamic viscoelasticity spectrum of a cured product of a thermosetting adhesive (measured curve in a variable formulation (the content of an isocyanate is 0.7 times as much as the standard formulation)).
Figure 11:
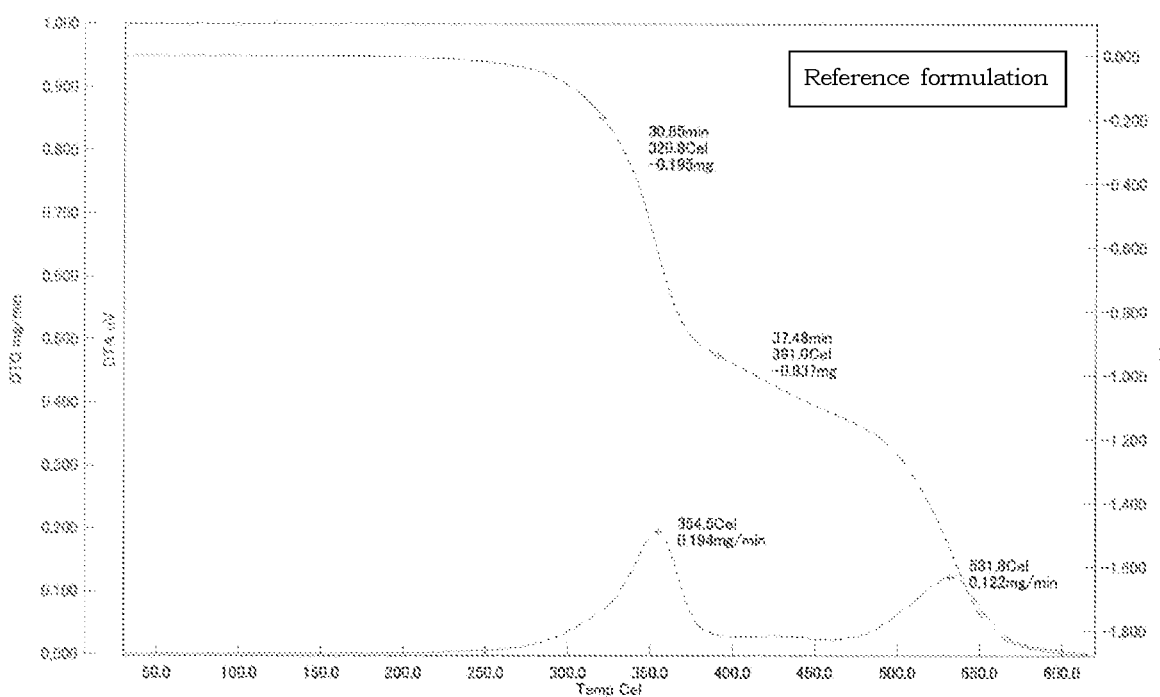
FIG. 11 is a view showing the result of thermogravimetric differential thermal analysis of a cured product of a thermosetting adhesive (measured curve in a reference formulation).
Figure 12:
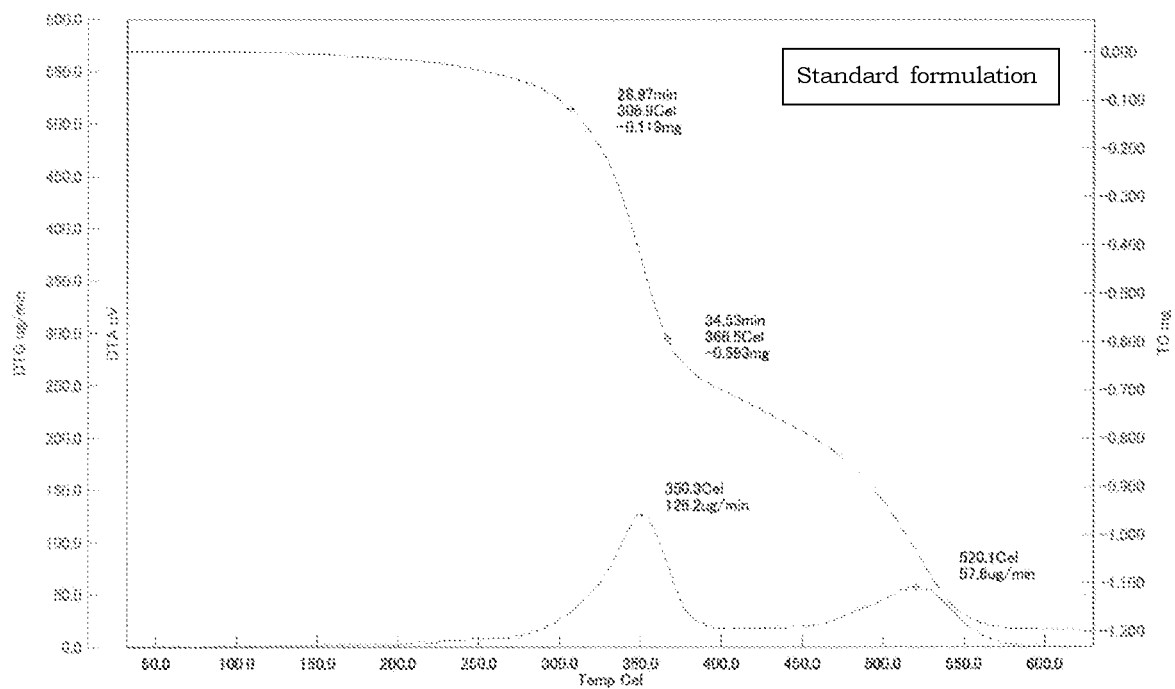
FIG. 12 is a view showing the result of thermogravimetric differential thermal analysis of a cured product of a thermosetting adhesive (measured curve in a standard formulation).
Figure 13:
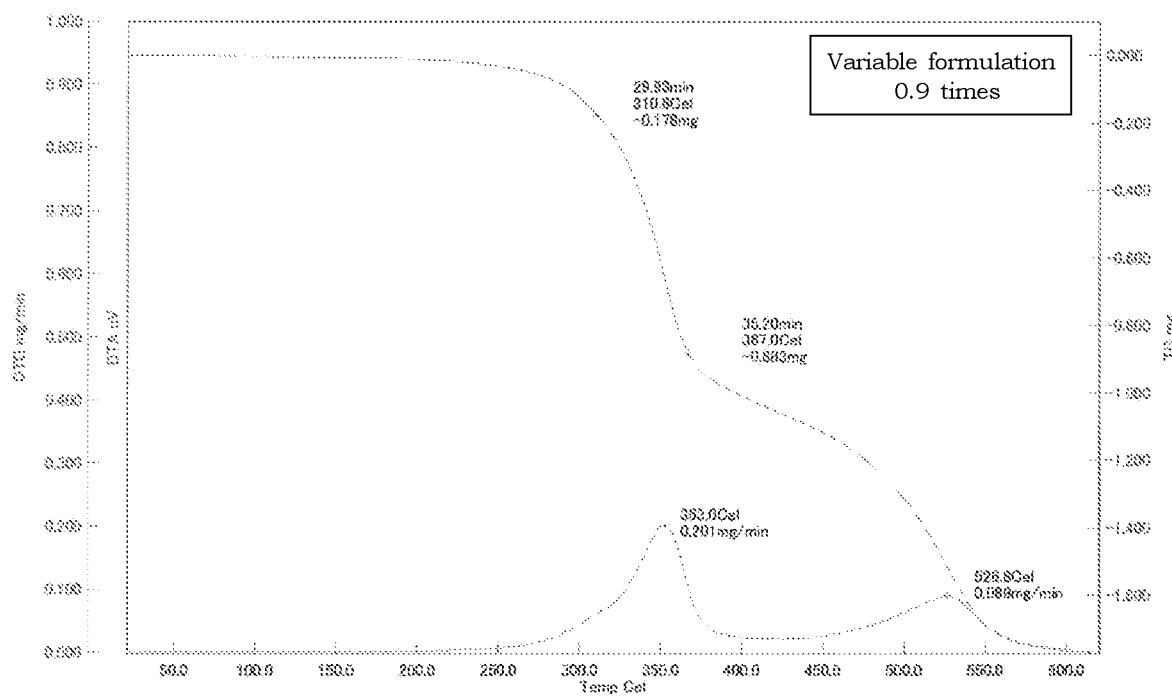
FIG. 13 is a view showing the result of thermogravimetric differential thermal analysis of a cured product of a thermosetting adhesive (measured curve in a variable formulation (the content of an isocyanate is 0.9 times as much as the standard formulation)).
Figure 14:
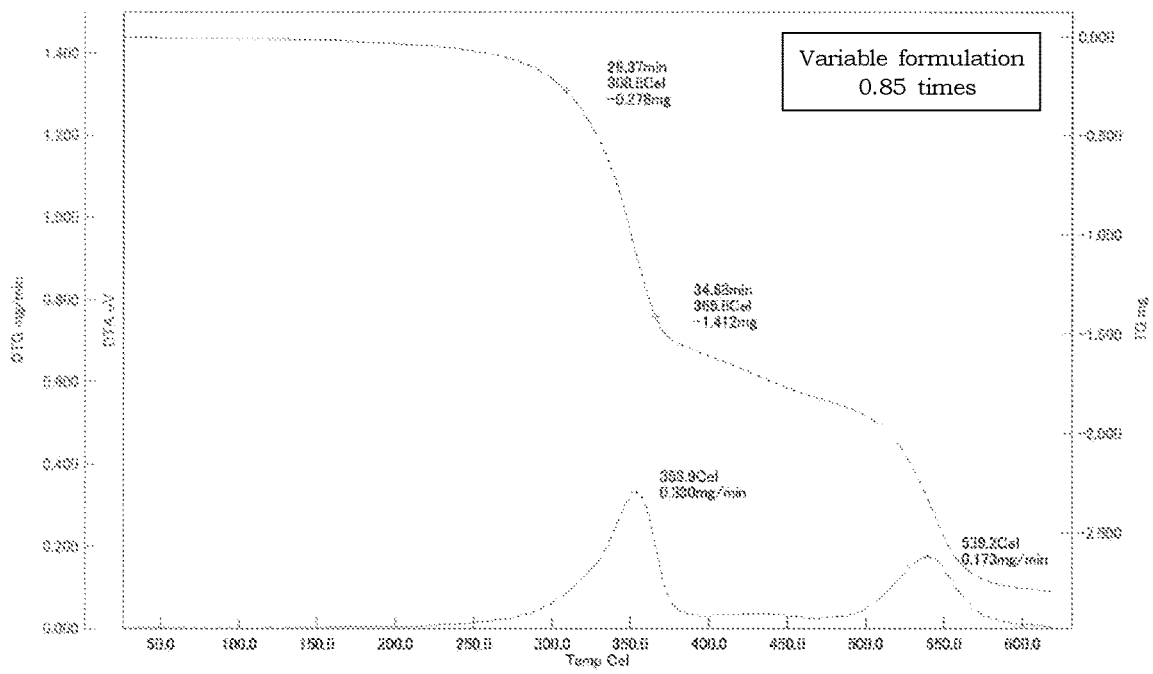
FIG. 14 is a view showing the result of thermogravimetric differential thermal analysis of a cured product of a thermosetting adhesive (measured curve in a variable formulation (the content of an isocyanate is 0.85 times as much as the standard formulation)).
Figure 15:
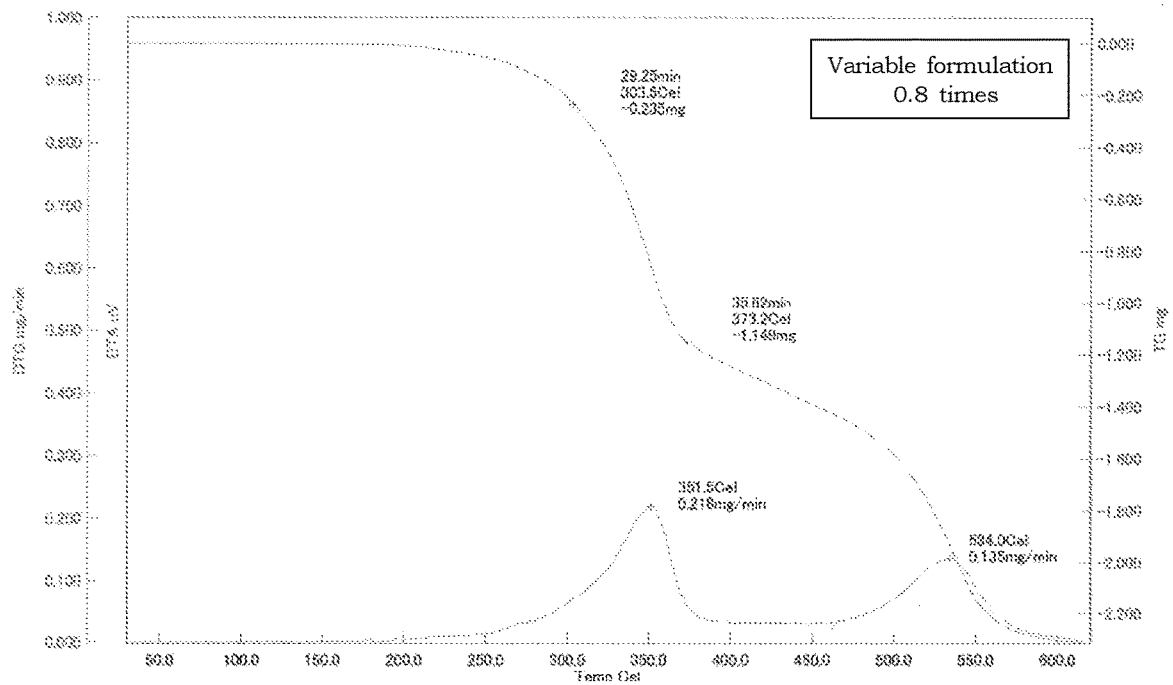
FIG. 15 is a view showing the result of thermogravimetric differential thermal analysis of a cured product of a thermosetting adhesive (measured curve at a variable formulation (the content of an isocyanate is 0.8 times as much as the standard formulation)).
Figure 16:
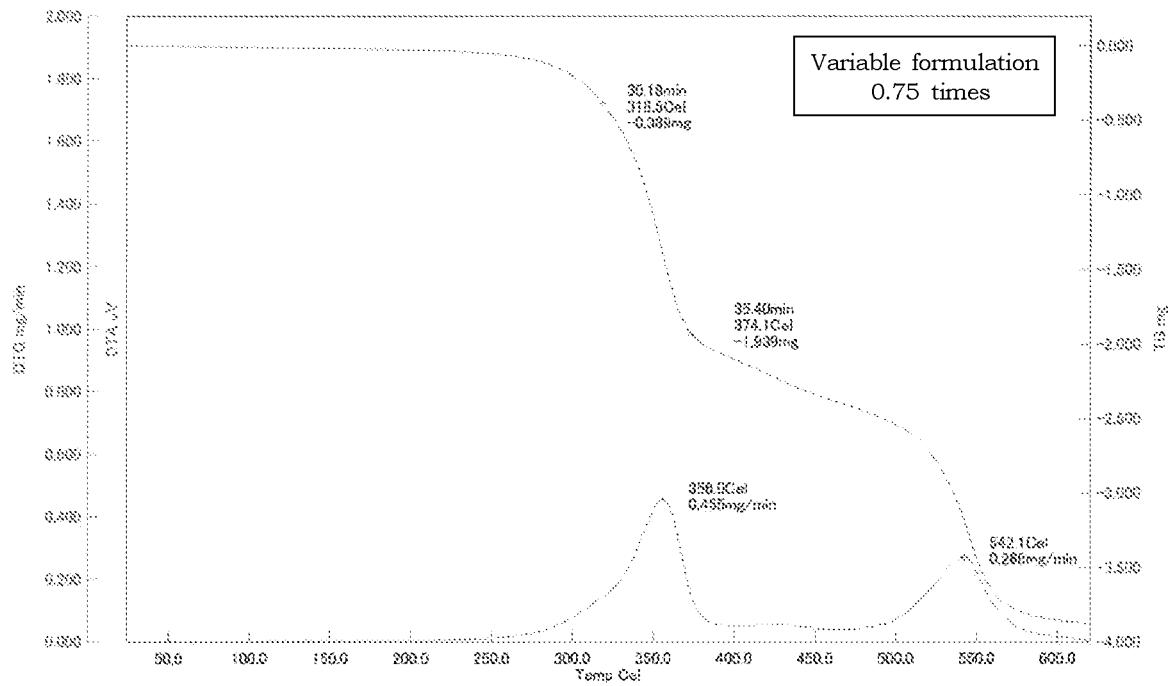
FIG. 16 is a view showing the result of thermogravimetric differential thermal analysis of a cured product of a thermosetting adhesive (measured curve in a variable formulation (the content of an isocyanate is 0.75 times as much as the standard formulation)).
Figure 17:
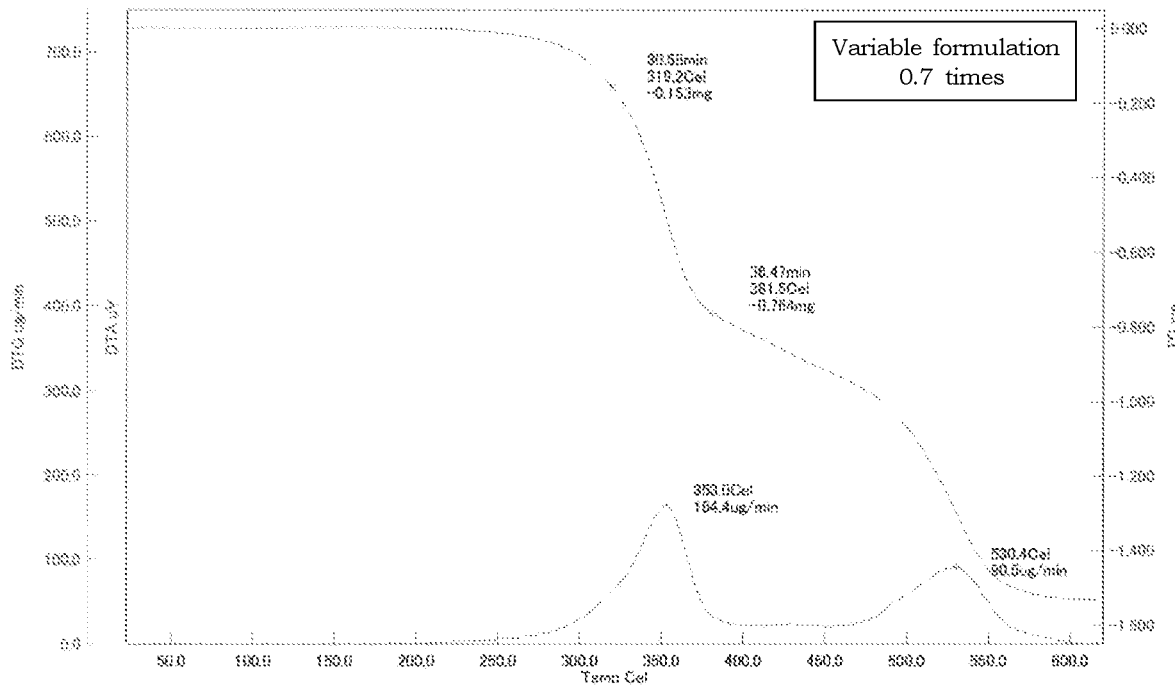
FIG. 17 is a view showing the result of thermogravimetric differential thermal analysis of a cured product of a thermosetting adhesive (measured curve in a variable formulation (the content of an isocyanate is 0.7 times as much as the standard formulation)).

FIG. 4 to FIG. 17 show the measurement results of the dynamic viscoelasticity spectrum (temperature-loss tangent) and the measurement results of the thermogravimetric differential thermal analysis (TG/DTA). Among these, as can be seen from a comparison between FIG. 11 (reference formulation) and FIG. 12 (standard formulation), significant mass reductions in two stages including a mass reduction at around 350° C. and a mass reduction at around 530° C. are observed in TG/DTA of the thermosetting adhesives, and in the thermosetting adhesive including the phenoxy resin, the first mass reduction occurs at an earlier timing, that is, when the thermosetting adhesive reaches a temperature about 4° C. lower, and the second mass reduction occurs at an earlier timing, that is, when the thermosetting adhesive reaches a temperature about 12° C. lower, than the respective mass reductions of the thermosetting adhesive of the reference formulation. Further, as can be seen from a comparison between FIG. 4 (reference formulation) and FIG. 5 (standard formulation), FIG. 5 showing the measurement result of the thermosetting adhesive including the phenoxy resin shows a peak at about 130° C., and the peak seems to be derived from softening of the phenoxy resin. Here, as is evident from the figures (FIGS. 6 to 10 and FIGS. 13 to 17) respectively having different amounts of the isocyanate, the peak that seems to be derived from the softening of the phenoxy resin disappears as the amount of the isocyanate decreases, and the timing at which the mass reduction observed in TG/DTA occurs comes back to the timing equivalent to that of the thermosetting adhesive of the reference formulation.

It is understood from these above that, according to the present invention, a thermosetting adhesive having advantages of both the heat resistance of the epoxy-modified polyurethane resin and the toughness of the phenoxy resin can be provided.

REFERENCE SIGNS LIST

10: Semiconductor device
20: Positive electrode terminal
30: Negative electrode terminal
40: Adhesive sheet
40a: First adhesive surface
40b: Second adhesive surface
41: First adhesive layer
42: Second adhesive layer
43: Base layer

The invention claimed is:

1. A thermosetting adhesive comprising:
an adhesive component, wherein
dynamic viscoelasticity spectrum of a cured product obtained by curing the thermosetting adhesive has a peak indicating a softening temperature at 200° C. or higher and has no peak at 160° C. or lower,
the adhesive component comprises a polyurethane, an isocyanate, and an epoxy chemically bonded to each other to form an epoxy-modified polyurethane,
the polyurethane has a carboxyl group, and
the adhesive component further comprises a phenoxy resin.

2. The thermosetting adhesive according to claim 1, wherein the dynamic viscoelasticity spectrum of the cured product obtained by curing the thermosetting adhesive has no peak in a range of above 160° C. to below the softening temperature.

3. The thermosetting adhesive according to claim 1, wherein the softening temperature of the phenoxy resin is 50° C. or more and 90° C. or less.

4. The thermosetting adhesive according to claim 1, further comprising a foaming agent component for causing the adhesive component into a foamed state, wherein
the foaming agent component comprises thermally expandable microcapsules.

5. The thermosetting adhesive according to claim 1, wherein
the thermosetting adhesive when used to cause two steel plates to adhere to each other under conditions (1) to (4) below has a shear adhesive force at 150° C. of 15 MPa or more that is exerted between the steel plates, and has a shear adhesive force at 200° C. of 3.5 MPa or more:
(1) 100° C.×6 hours,
(2) 110° C.×3 hours,
(3) 150° C.×15 minutes, and
(4) 180° C.×5 minutes.

6. The thermosetting adhesive according to claim 1, wherein the adhesive component further comprises an inorganic filler having an average particle size of 0.5 μm or more and 2 μm or less.

7. An adhesive sheet comprising:
a base layer composed of a sheet-shaped base material; and
an adhesive layer composed of the thermosetting adhesive according to claim 1, wherein
the adhesive layer is laminated on one side, or each of both sides, of the base layer.

8. The thermosetting adhesive according to claim 1, wherein the isocyanate is a blocked isocyanate that has blocked isocyanate groups.

* * * * *